(12) United States Patent
Vanderwees et al.

(10) Patent No.: US 10,601,093 B2
(45) Date of Patent: Mar. 24, 2020

(54) COUNTER-FLOW HEAT EXCHANGER FOR BATTERY THERMAL MANAGEMENT APPLICATIONS

(71) Applicant: Dana Canada Corporation, Oakville (CA)

(72) Inventors: Doug Vanderwees, Mississauga (CA); Kenneth Abels, Oakville (CA); Benjamin Kenney, Toronto (CA); Andrew Buckrell, Kitchener (CA)

(73) Assignee: Dana Canada Corporation, Oakville (CA)

( * ) Notice: Subject to any disclaimer, the term of this patent is extended or adjusted under 35 U.S.C. 154(b) by 66 days.

(21) Appl. No.: 15/135,066

(22) Filed: Apr. 21, 2016

(65) Prior Publication Data
US 2016/0315365 A1    Oct. 27, 2016

Related U.S. Application Data

(60) Provisional application No. 62/150,625, filed on Apr. 21, 2015.

(51) Int. Cl.
   *H01M 10/6557*    (2014.01)
(52) U.S. Cl.
   CPC .............................. *H01M 10/6557* (2015.04)
(58) Field of Classification Search
   CPC ......... H01M 10/6557; H01M 10/6568; H01M 10/6556; F28D 1/0308; F28D 1/0325;
   (Continued)

(56) References Cited

U.S. PATENT DOCUMENTS 2,410,952 A    11/1946   Lighton
4,210,127 A *  7/1980   Kleine ..................... F24J 2/205
                                                      126/663
(Continued)

FOREIGN PATENT DOCUMENTS

CN       103123186 A       5/2013
DE    102012006122 A1 *   9/2013   ......... H05K 7/20254

OTHER PUBLICATIONS

International Search Report with Written Opinion for PCT/CA2016/050462.

(Continued)

*Primary Examiner* — Tho V Duong
*Assistant Examiner* — Raheena R Malik
(74) *Attorney, Agent, or Firm* — McCoy Russell LLP

(57) ABSTRACT

A heat exchanger for thermal management of battery units made-up of a plurality of battery cells or containers housing one or more battery cells is disclosed. The heat exchanger has a main body portion formed by a pair of outer plates and an intermediate plate defining a primary heat transfer surface on either side of the heat exchanger for contacting a corresponding surface of at least one of the battery cells or containers. The intermediate plate together with the outer plates forming a plurality of alternating first and second fluid flow passages the flow direction through the first fluid flow passages being generally opposite to the flow direction through the second fluid flow passages. The first and second fluid flow passages are formed on opposite sides of the intermediate plate and are fluidly interconnected at corresponding ends creating a counter-flow arrangement through the main body portion of the heat exchanger.

20 Claims, 21 Drawing Sheets

(58) Field of Classification Search
CPC ........ F28D 1/035; F28D 1/0341; F28F 3/025; F28F 3/02
USPC .................................................. 165/172, 168
See application file for complete search history.

(56) References Cited

U.S. PATENT DOCUMENTS

| | | | | |
|---|---|---|---|---|
| 4,478,277 | A | 10/1984 | Friedman et al. | |
| 5,005,640 | A * | 4/1991 | Lapinski | F28D 9/00 165/142 |
| 5,645,127 | A * | 7/1997 | Enderle | F02K 1/822 165/168 |
| 5,718,286 | A | 2/1998 | Damsohn et al. | |
| 5,836,383 | A | 11/1998 | Zwittig | |
| 6,613,472 | B1 | 9/2003 | Watanabe | |
| 8,182,661 | B2 | 5/2012 | Tanase et al. | |
| 8,297,343 | B2 | 10/2012 | Yang | |
| 8,418,365 | B2 | 4/2013 | German et al. | |
| 8,622,116 | B2 | 1/2014 | Yang | |
| 8,911,896 | B2 | 12/2014 | Jin | |
| 8,997,840 | B2 * | 4/2015 | Yang | B05D 5/04 165/104.26 |
| 2005/0170241 | A1 | 8/2005 | German et al. | |
| 2006/0172177 | A1 * | 8/2006 | Scherer | H01M 8/0247 429/514 |
| 2008/0090123 | A1 * | 4/2008 | Peng | H01M 8/0278 429/437 |
| 2009/0239112 | A1 * | 9/2009 | Vanderwees | H01M 8/04067 429/429 |
| 2010/0132930 | A1 | 6/2010 | Izenson et al. | |
| 2010/0175857 | A1 * | 7/2010 | Gerstler | F28D 15/00 165/104.31 |
| 2010/0261046 | A1 | 10/2010 | German et al. | |
| 2011/0262794 | A1 | 10/2011 | Yoon | |
| 2011/0277967 | A1 * | 11/2011 | Fried | F28D 15/0266 165/104.26 |
| 2012/0082880 | A1 * | 4/2012 | Koetting | B21D 53/04 429/120 |
| 2012/0181712 | A1 * | 7/2012 | Vanderwees | H01M 8/04074 261/102 |
| 2012/0237805 | A1 * | 9/2012 | Abels | H01M 2/1077 429/83 |
| 2013/0071720 | A1 | 3/2013 | Zahn | |
| 2013/0126140 | A1 * | 5/2013 | Park | F28F 9/0273 165/173 |
| 2013/0171493 | A1 * | 7/2013 | Wayne | F28F 3/12 429/120 |
| 2013/0244077 | A1 | 9/2013 | Palanchon et al. | |
| 2013/0273829 | A1 | 10/2013 | Obasih et al. | |
| 2013/0280596 | A1 * | 10/2013 | Lee | H01M 2/1061 429/176 |
| 2013/0312939 | A1 * | 11/2013 | Uchida | F28D 15/04 165/104.26 |
| 2013/0330577 | A1 * | 12/2013 | Kristofek | H01M 2/1077 429/50 |
| 2014/0050953 | A1 * | 2/2014 | Yoon | H01M 2/1077 429/82 |
| 2014/0147709 | A1 * | 5/2014 | Ketkar | H01M 10/6569 429/50 |
| 2014/0162107 | A1 * | 6/2014 | Obrist | F28F 3/12 429/120 |
| 2014/0272496 | A1 * | 9/2014 | Han | H01M 10/625 429/83 |
| 2014/0272513 | A1 | 9/2014 | Sun et al. | |
| 2014/0272518 | A1 | 9/2014 | Silk et al. | |
| 2014/0299302 | A1 | 10/2014 | Moreau et al. | |
| 2015/0010801 | A1 * | 1/2015 | Arena | H01M 2/10 429/100 |
| 2015/0168078 | A1 * | 6/2015 | Yang | F28D 15/04 165/104.26 |
| 2015/0180059 | A1 * | 6/2015 | Vanderwees | H01M 8/04074 261/102 |
| 2015/0200429 | A1 * | 7/2015 | Lee | H01M 10/613 429/120 |
| 2016/0036104 | A1 * | 2/2016 | Kenney | H01M 10/6556 429/120 |
| 2016/0049705 | A1 * | 2/2016 | Mahe | H01M 10/625 429/120 |
| 2016/0097598 | A1 * | 4/2016 | Hirsch | H01M 10/6556 165/175 |
| 2016/0204486 | A1 * | 7/2016 | Kenney | H01M 10/6556 429/120 |

OTHER PUBLICATIONS

English Machine Translation of DE 102012006122 A1.
International Search Report and Written Opinion for application No. PCT/CA2015/051340, dated Feb. 23, 2016, issued by the Canadian Intellectual Property Office.
China National Intellectual Property Administration, Chinese Office Action in Application No. CN201680034017.6, dated Sep. 2, 2019, 21 pages.

* cited by examiner

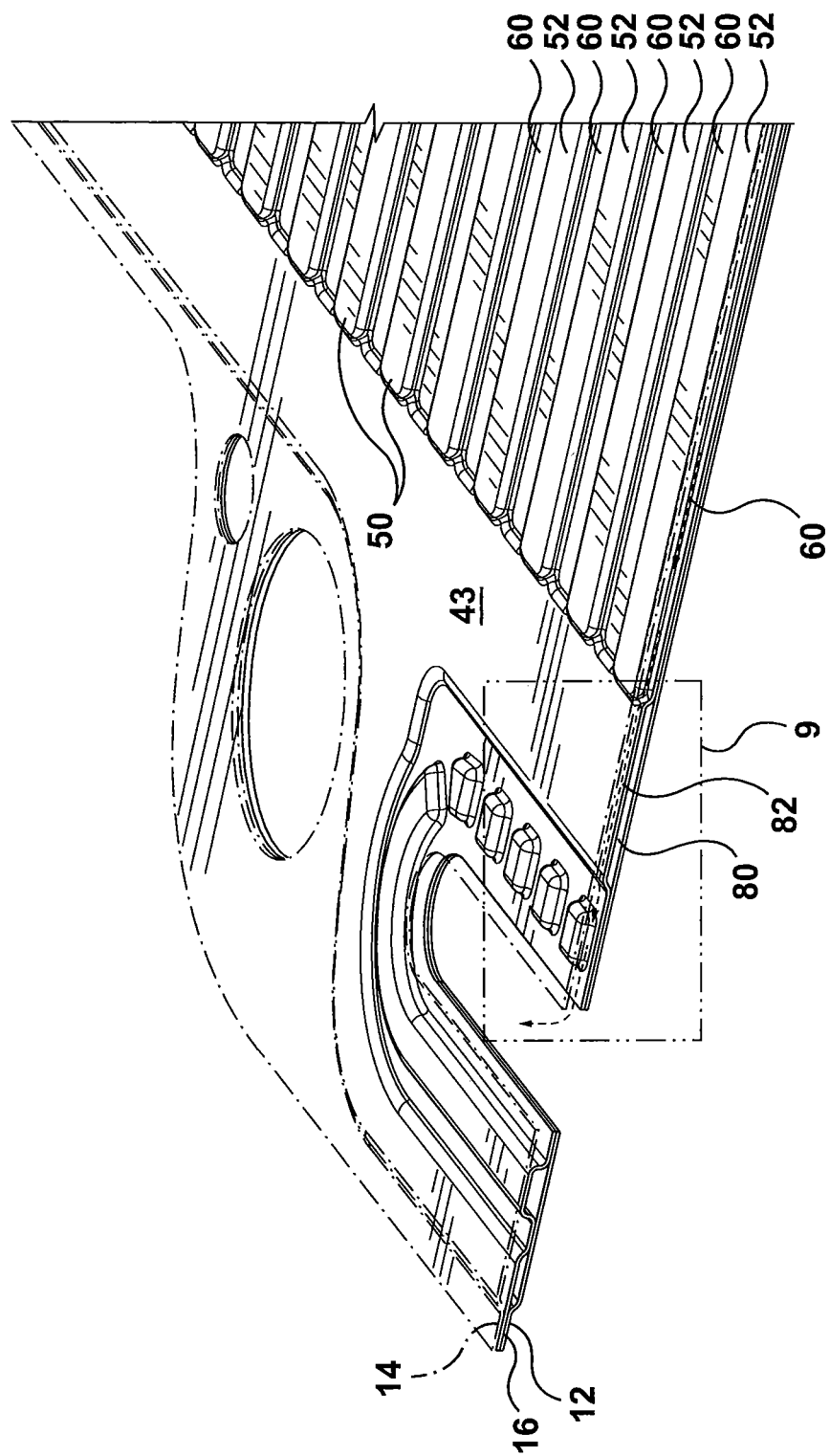

COUNTER-FLOW HEAT EXCHANGER FOR BATTERY THERMAL MANAGEMENT APPLICATIONS

CROSS-REFERENCE TO RELATED APPLICATION

This application claims priority to and the benefit of U.S. Provisional Patent Application No. 62/150,625, filed Apr. 21, 2015 under the title COUNTER-FLOW HEAT EXCHANGER FOR BATTERY THERMAL MANAGEMENT APPLICATIONS. The content of the above patent application is hereby expressly incorporated by reference into the detailed description of the present application.

TECHNICAL FIELD

This disclosure relates to a heat exchanger for battery thermal management applications. More specifically, the disclosure relates to a battery cell heat exchanger that can be arranged underneath a stack of a plurality of adjacent battery cells or battery cell containers, or that can be arranged in between the adjacent battery cells or battery cell containers in the stack to dissipate heat in rechargeable battery units.

BACKGROUND

Rechargeable batteries such as batteries made up of many lithium-ion cells can be used in many applications, including for example, electric propulsion vehicle ("EV") and hybrid electric vehicle ("HEV") applications. These applications often require advanced battery systems that have high energy storage capacity and can generate large amounts of heat that needs to be dissipated. Battery thermal management of these types of systems generally requires that the maximum temperature of the individual cells be below a predetermined, specified temperature.

Cold plate heat exchangers are heat exchangers upon which a stack of adjacent battery cells or battery cell containers housing one or more battery cells are arranged for cooling and/or regulating the temperature of a battery unit. The individual battery cells or battery cell containers are arranged in face-to-face contact with each other to form the stack, the stack of battery cells or battery cell containers being arranged on top of a cold plate heat exchanger such that an end face or end surface of each battery cell or battery cell container is in surface-to-surface contact with a surface of the heat exchanger.

Heat exchangers for cooling and/or regulating the temperature of a battery unit can also be arranged in between the individual battery cells or battery cell containers that form the stack or battery unit, the individual heat exchangers being interconnected by common inlet and outlet manifolds. Heat exchangers that are arranged or "sandwiched" between the adjacent battery cells or battery cell containers in the stack may sometimes be referred to as inter-cell elements (e.g. "ICE" plate heat exchangers) or cooling fins.

Temperature uniformity across the surface of an individual battery cell as well as the temperature uniformity of all the cells in the battery pack is of significant importance since the battery is a chemical reaction of which its performance is significantly affected by the temperature at which it runs. A thermal gradient in the battery will cause some cells to charge and discharge faster than others, causing battery pack durability issues. Accordingly, temperature uniformity across the surface of the heat exchanger is an important consideration in the thermal management of battery units since temperature uniformity across the surface of the heat exchanger helps to ensure that the temperature differential between individual battery cells in the overall battery unit is kept to a minimum. It is generally understood that the temperature of the coolant travelling through the heat exchanger will increase as it travels through along the length of the fluid channel(s) from the inlet to the outlet. Given that the surface temperature of the heat exchanger will generally be proportional to the temperature of the coolant or fluid travelling through the heat exchanger, the temperature of the coolant will be colder at the inlet end of the heat exchanger and warmer near the outlet end of the heat exchanger resulting in an inherent temperature differential across the surface of the heat exchanger. Accordingly, battery cells arranged proximal to the inlet end of the heat exchanger will be subject to a lower coolant temperature than battery cells arranged proximal to the outlet end of the heat exchanger resulting in a potential temperature differential between the individual battery cells, which generally is undesirable. Therefore, heat exchangers that offer improved temperature uniformity across the heat exchange surface may offer improved or more consistent cooling to the individual battery cells or battery cell containers across the entire surface of the heat exchanger plates.

SUMMARY OF THE PRESENT DISCLOSURE

In accordance with an example embodiment of the present disclosure there is provided a battery cell heat exchanger, comprising a main body portion having opposed ends and first and second outer surface each defining a primary heat transfer surface between said opposed ends, said main body portion comprising a first outer plate, a second outer plate and an intermediate plate arranged in between said first and second outer plates; a plurality of first fluid flow passages formed within said main body portion between said intermediate plate and one of said first and second outer plates, each of said first fluid flow passages having a first end for inletting a fluid into said first fluid flow passages and a second end for discharging said fluid from said first fluid flow passages, said first and second ends defining a flow direction through said first fluid flow passages; a plurality of second fluid flow passages formed within said main body portion between said intermediate plate and the other one of said first and second outer plates, each of said second fluid flow passages having a first end for inletting said fluid into said second fluid flow passages and a second end for discharging said fluid from said second fluid flow passages, said first and second ends defining a flow direction through said second fluid flow passages; an inlet manifold in fluid communication with said, first ends of said plurality of first fluid flow passages; an outlet manifold in fluid communication with said second ends of said plurality of second fluid flow passages; wherein said first and second fluid flow passages are arranged so as to alternate through said main body portion such that the first fluid flow passages are in heat transfer relationship with said second fluid flow passages; and wherein said second ends of said first fluid flow passages are in fluid communication with said first end of said second fluid flow passages, the flow direction of said first fluid flow passages therefore being opposite to the flow direction of said second fluid flow passages.

BRIEF DESCRIPTION OF THE DRAWINGS

Reference will now be made, by way of example, to the accompanying drawings which show example embodiments of the present application, and in which:

FIG. 9 is a detail, perspective view of the heat exchanger of FIG. 1 taken along a longitudinal section line through the outlet manifold with the top plate of the heat exchanger being transparent and including schematic flow lines illustrating the outflow from the heat exchanger;

Similar reference numerals' may have been used in different figures to denote similar components.

DESCRIPTION OF EXAMPLE EMBODIMENTS

Figure 1:
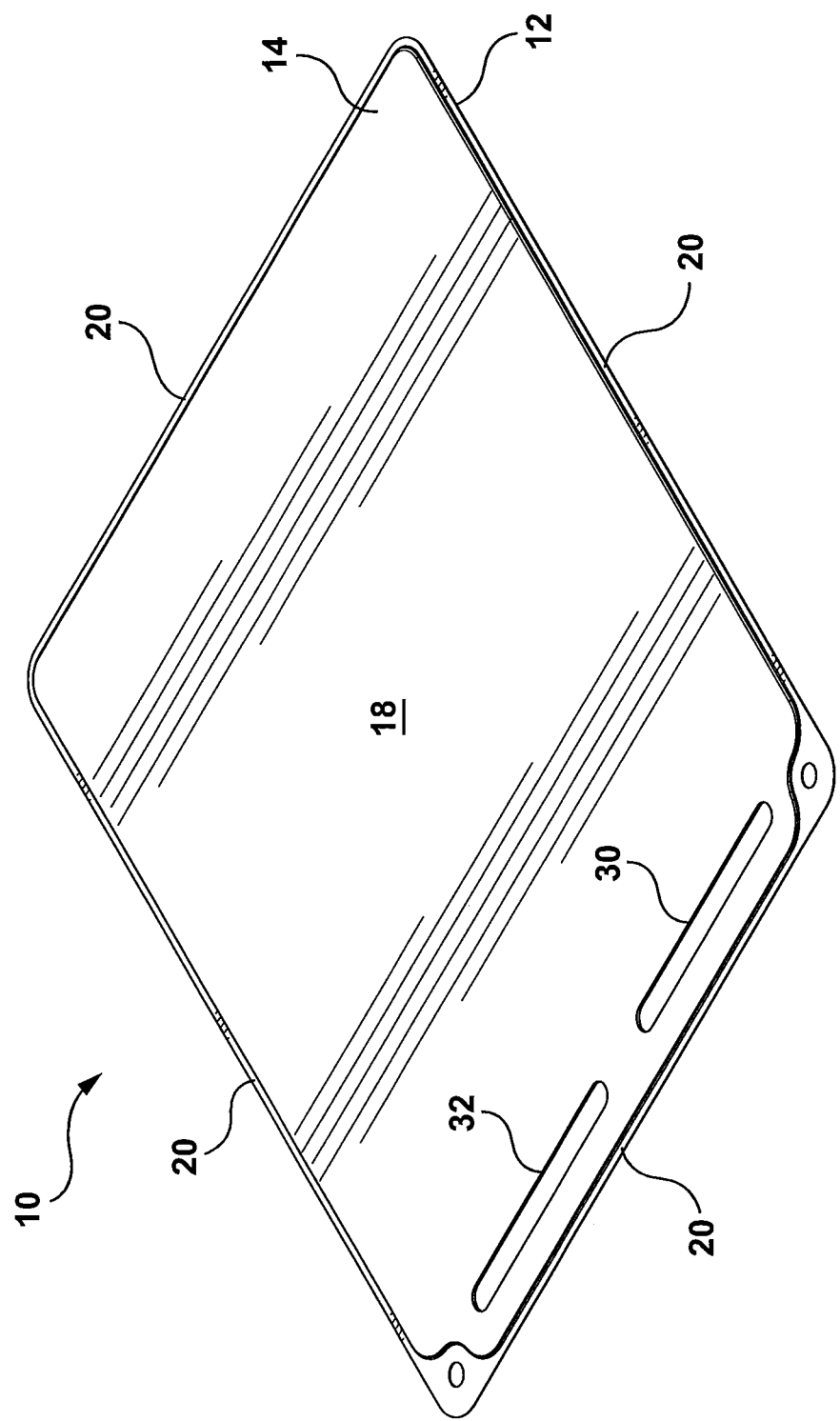
FIG. 1 is a perspective view of a battery cell heat exchanger according to an example embodiment according to the present disclosure.

Referring now to FIG. 1, there is shown an example embodiment of a battery cooling heat exchanger 10 according to an example embodiment of the present disclosure. As shown, the battery cooling heat exchanger 10 is comprised of a pair of outer plates 12, 14 with an intermediate plate 16 sandwiched therebetween. Outer plates 12, 14 each define a central, generally planar portion 18 that is surrounded by a peripheral flange 20. Peripheral flange 20 extends outwardly away from the central, generally planar portion 18 and around the perimeter of the outer plates 12, 14. The central, generally planar portion 18 of each of the plates 12, 14 projects out of the plane of the peripheral flange 20 so that when the outer plates 12, 14 are assembled together with the intermediate plate 16, interior spaces or gaps are formed between the central, generally planar portions 18 of each of the outer plates 12, 14 and the corresponding side or surface of the intermediate plate 16. More specifically, in the example embodiment illustrated in the drawings, outer plates 12, 14 are generally identical to each other with one of the outer plates 12, 14 being inverted with respect to the other of the outer plates 12, 14 when assembled together with the intermediate plate 16 so that the outer plates 12, 14 are essentially mirror images of each other. Therefore, when the outer plates 12, 14 and intermediate plate 16 are assembled together, the first (or lower) outer plate 12 is arranged underneath (or on one side of) intermediate plate 16 and the second (or upper) outer plate 14 is arranged on top of (or on the opposite side of) intermediate plate 16. When the outer plates 12, 14 and intermediate plate 16 are arranged together, the peripheral flange 20 of the respective outer plate 12, 14 seals against a corresponding portion of the corresponding side of intermediate plate 16 providing a fluid tight seal when the plates are brazed or otherwise joined together and spacing apart the central, generally planar portion 18 of each outer plate 12, 14 from the intermediate plate 16 forming gaps therebetween. Accordingly, a first gap 26 is formed between the first or lower outer plate 12 and the corresponding surface or first side 15 of intermediate plate 16. Similarly, a second gap 28 is formed between the second, or upper, outer plate 14 and the corresponding surface or second side 17 of intermediate plate 16.

While the example embodiment illustrated in the drawings shows the outer plates 12, 14 as being formed with a peripheral flange 20 that extends in a different plane than the central, generally planar portion 18 of the plates 12, 14, it will be understood that the outer plates 12, 14 could also be formed as stamped, flat plates with a separate frame member being arranged in between the respective outer plate 12, 14 and the corresponding surface or respective side 15, 17 of the intermediate plate 16 so as to provide the fluid tight seal and to space the outer plates 12, 14 away from the intermediate plate 16 forming gaps 26, 28 therebetween. Alternatively, the intermediate plate 16 could be formed with a peripheral rib or an equivalent sealing feature on either side thereof for sealing against the corresponding outer plate 12, 14. Therefore, it will be understood that various methods for sealing the outer plates 12, 14 to the intermediate plate 16 while providing gaps or enclosed fluid channels therebetween are contemplated within the scope of the present disclosure.

Figure 2:
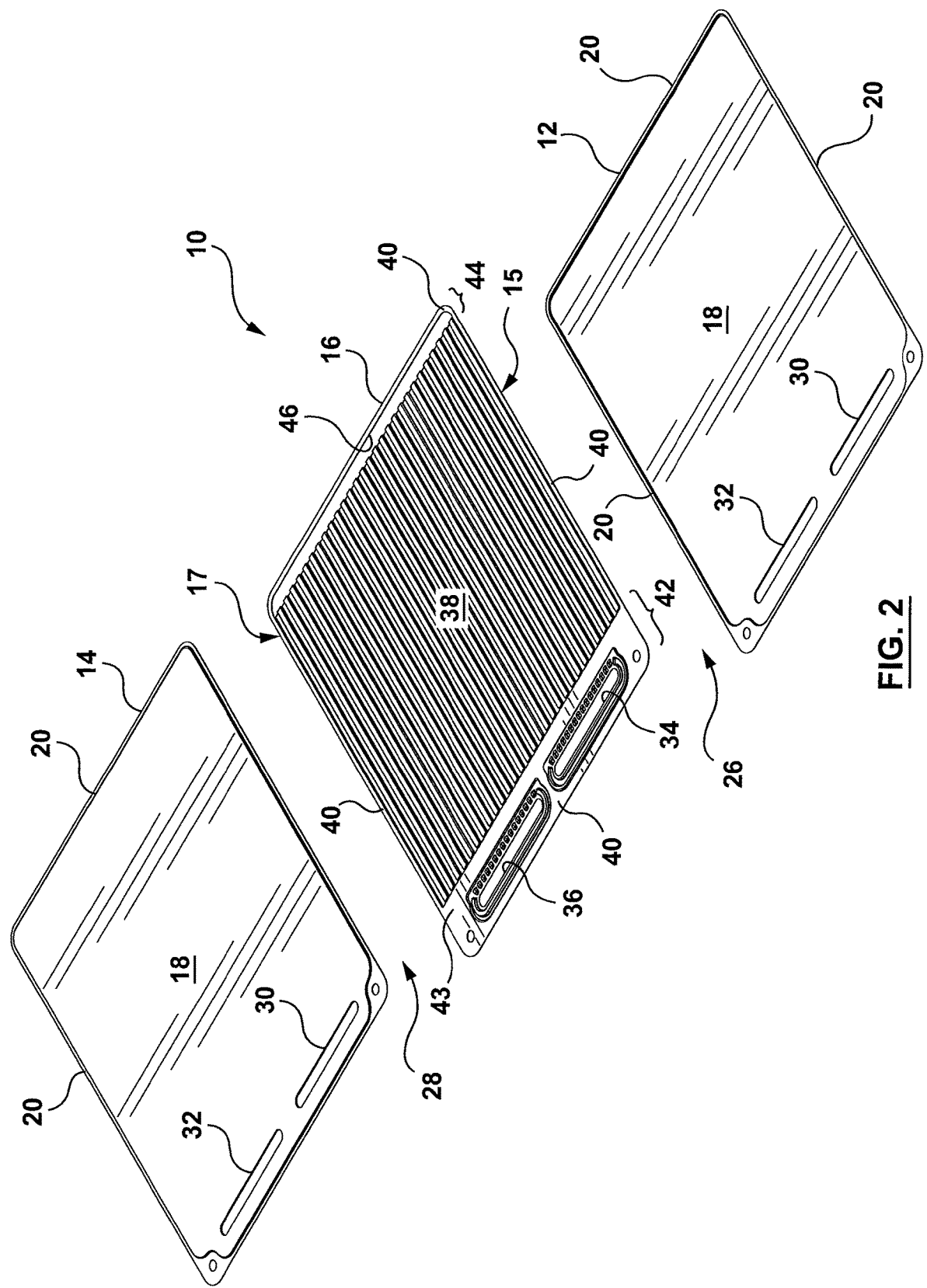
FIG. 2 is an exploded, perspective view of the heat exchanger of FIG. 1.

Referring now to FIG. 2, inlet and outlet openings 30, 32 are formed at one end of the outer plates 12, 14. Inlet and outlet openings 30, 32 are arranged adjacent to each other and laterally aligned along the end or width of the plates 12, 14. Corresponding inlet and outlet manifold openings 34, 36 are also formed in intermediate plate 16. Therefore, when the outer plates 12, 14 and intermediate plate 16 are assembled together, the inlet and outlet openings 30, 32 formed in outer plates 12, 14 are axially aligned with the corresponding inlet and outlet manifold openings 34, 36 formed in the intermediate plate 16. The inlet and outlet manifold openings 34, 36 are specifically shaped and/or formed so that the inlet manifold opening 34 provides fluid access to the first gap 26 formed between the first outer plate 12 and intermediate plate 16 while the outlet manifold opening 36 provides fluid access to the second gap 28 formed between the second outer plate 14 and intermediate plate 16. The inlet and outlet openings 30, 32, 34, 36 together form inlet and outlet manifolds for inletting and discharging a heat exchange fluid to and from heat exchanger 10 as will be described in further detail below.

In the example embodiment illustrated in FIGS. 1-2, inlet and outlet openings 30, 32 are formed in both of the outer plates 12, 14. This is particularly suited for when the heat exchanger 10 is intended for use as an intercellular element (or ICE plate) wherein a plurality of heat exchangers 10 are provided that are intended to be interconnected by common, interconnecting inlet and outlet manifold fluid lines (not shown). If, on the other hand, heat exchanger 10 was adapted for use as a cold plate heat exchanger, inlet and outlet openings 30, 32 would be reduced to an inlet access similar to a hole for a hose barb fitting in the region 30 of plate 12 or 14 and an outlet access in the region of 32 of plate 12 or 14 with the other inlet or outlet portions of the other outer plate 12, 14 being potentially free of fluid openings.

Figure 3:
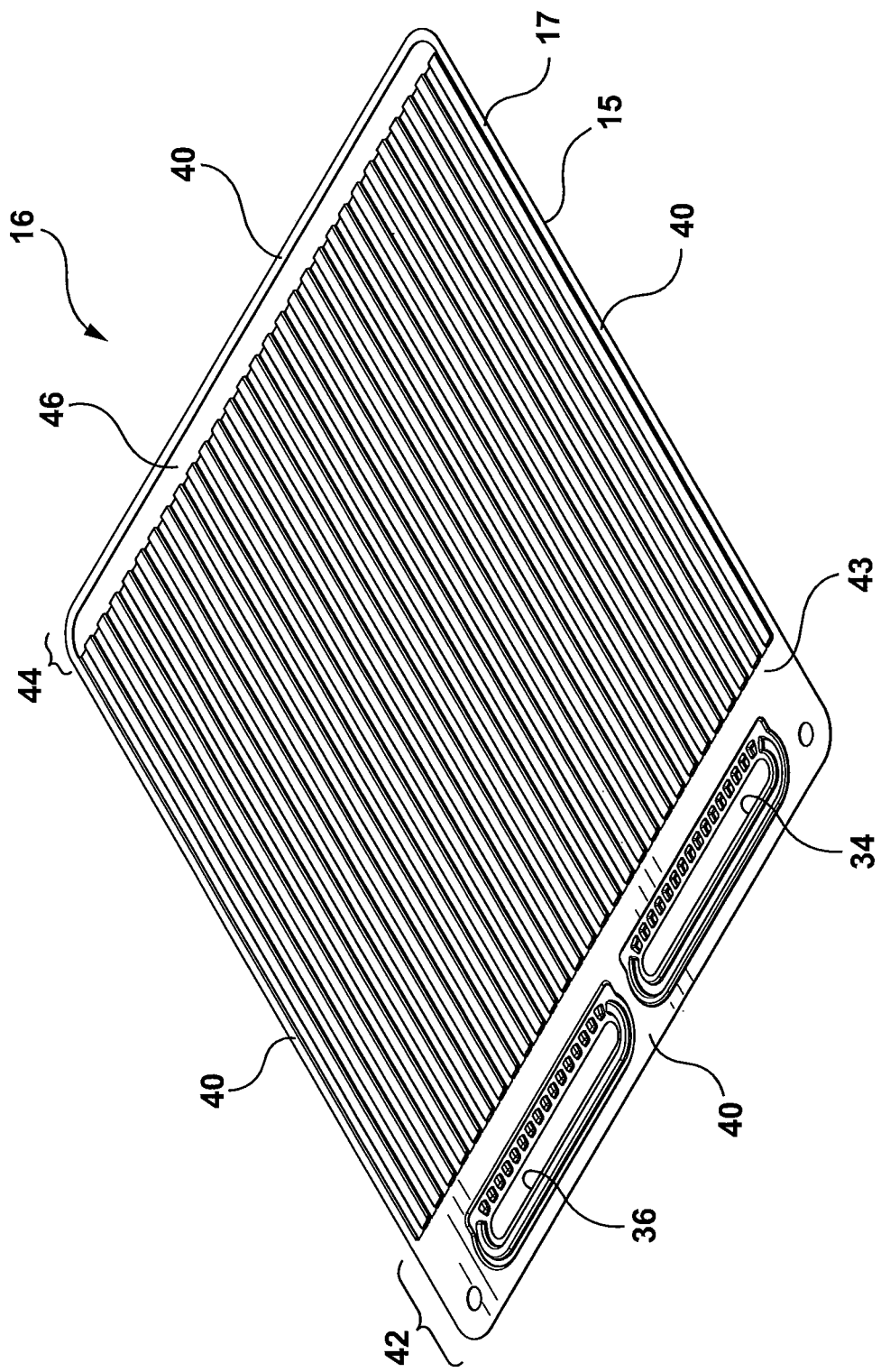
FIG. 3 is a perspective view of an intermediate plate of the heat exchanger of FIG. 1.
Figure 5:
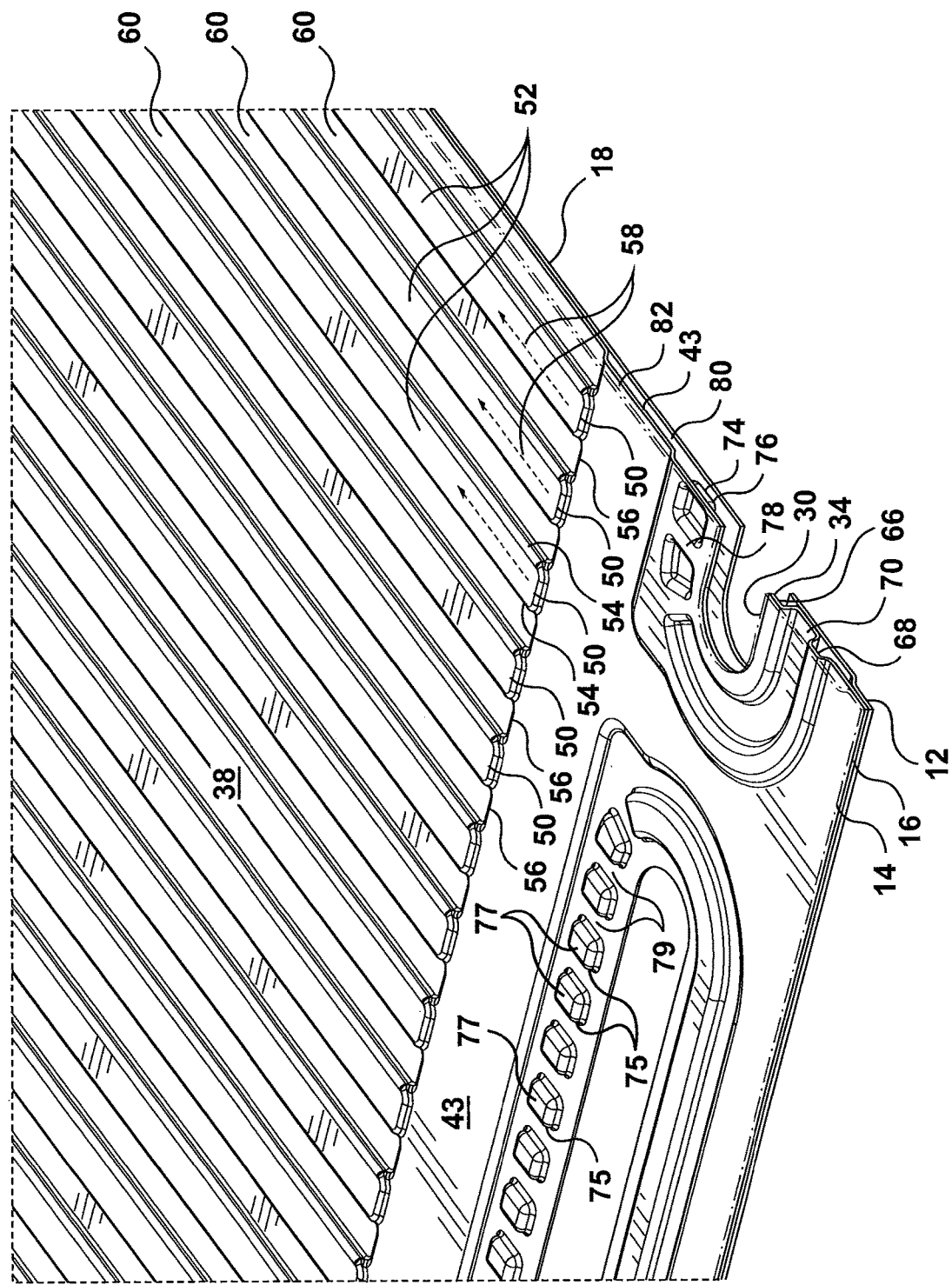
FIG. 5 is a detail, perspective view of the heat exchanger of FIG. 1 taken along a longitudinal section line through the inlet manifold with the top plate of the heat exchanger being transparent.

Referring now to FIGS. 2, 3 and 5, intermediate plate 16 will be described in further detail. Intermediate plate 16 is a generally planar member having a central, generally planar area 38 that is also surrounded by a peripheral flange 40. The intermediate plate 16 generally has the same foot print as outer plates 12, 14 with their respective peripheral flanges 20, 40 sealing together in face-to-face contact when the outer plates 12, 14 are assembled together with intermediate plate 16.

The central, generally planar area 38 extends between first and second ends 42, 44 of the intermediate plate 16. The first end 42 of intermediate plate 16 comprises inlet and outlet manifold openings 34, 36 and a transition area 43 arranged generally intermediate the inlet and outlet manifold openings 34, 36 and the central, generally planar area 38 of the intermediate plate 16, the transition area 43 extending along the width of the intermediate plate 16 and lying generally in the same plane as the peripheral flange 40 that forms the perimeter of intermediate plate 16. The second end 44 of intermediate plate 16 comprises an elongated manifold opening or channel 46 formed in the intermediate plate 16 that extends, generally, across the width of the intermediate plate 16, the manifold channel 46 therefore being arranged intermediate the central, generally planar area 38 of the plate 16 and the corresponding end edge of the surrounding portion of the peripheral flange 40.

The central, generally planar portion 38 of the plate 16 is generally in the form a corrugated surface comprising a plurality of interconnected convolutions or elongated ridges 50 formed across the surface of the plate 16 that extend the length of the central, generally planar area 38 between the transition area 43 and the manifold opening or channel 46. The convolutions or elongated ridges 50 are each comprised of a top surface portion 52 (or "crest") and a pair of side portions 54, the elongated ridges 50 being interconnected by bottom surface portions 56. The convolutions or elongated ridges 50 are formed within the central planar portion 38 of the plate such that the elongated ridges 50 protrude out of the plane of the intermediate plate 16 with the top surface portions 52 lying in a plane generally parallel to but spaced apart from or above the plane of the transition area 43 and the peripheral flange 40 and with the bottom surface portions 56 lying in a plane generally parallel to but spaced apart from or below the plane of the transition area 43 and the peripheral flange. The distance by which the elongated ridges 50 and bottom surface portions 56 protrude or are depressed out of the plane of the central planar portion 38 of the intermediate plate 16 generally corresponds to the distance by which the generally planar portion 18 of each of outer plates 12, 14 projects out of the plane of the corresponding peripheral flange 20. It will be understood that the terms "above" and "below" are used in reference to the illustrative orientation of the intermediate plate 16 as shown in the drawings and that these terms are not intended to be limiting as persons skilled in are will appreciate that the heat exchanger 10 may be arranged upright or in a number of different orientations.

A first set of flow passages 58 (as represented by dotted flow directional arrows in FIGS. 5 and 6) is formed in the spaces or cavities formed underneath each of the elongated ridges 50 while a second set of flow passages 60 is formed in the spaces or gaps formed between the elongated ridges 50 by bottom portions 56, the first and second flow passage 58, 60 therefore alternating across the width of the central, generally planar portion 38 of the intermediate plate 16.

Figure 4:
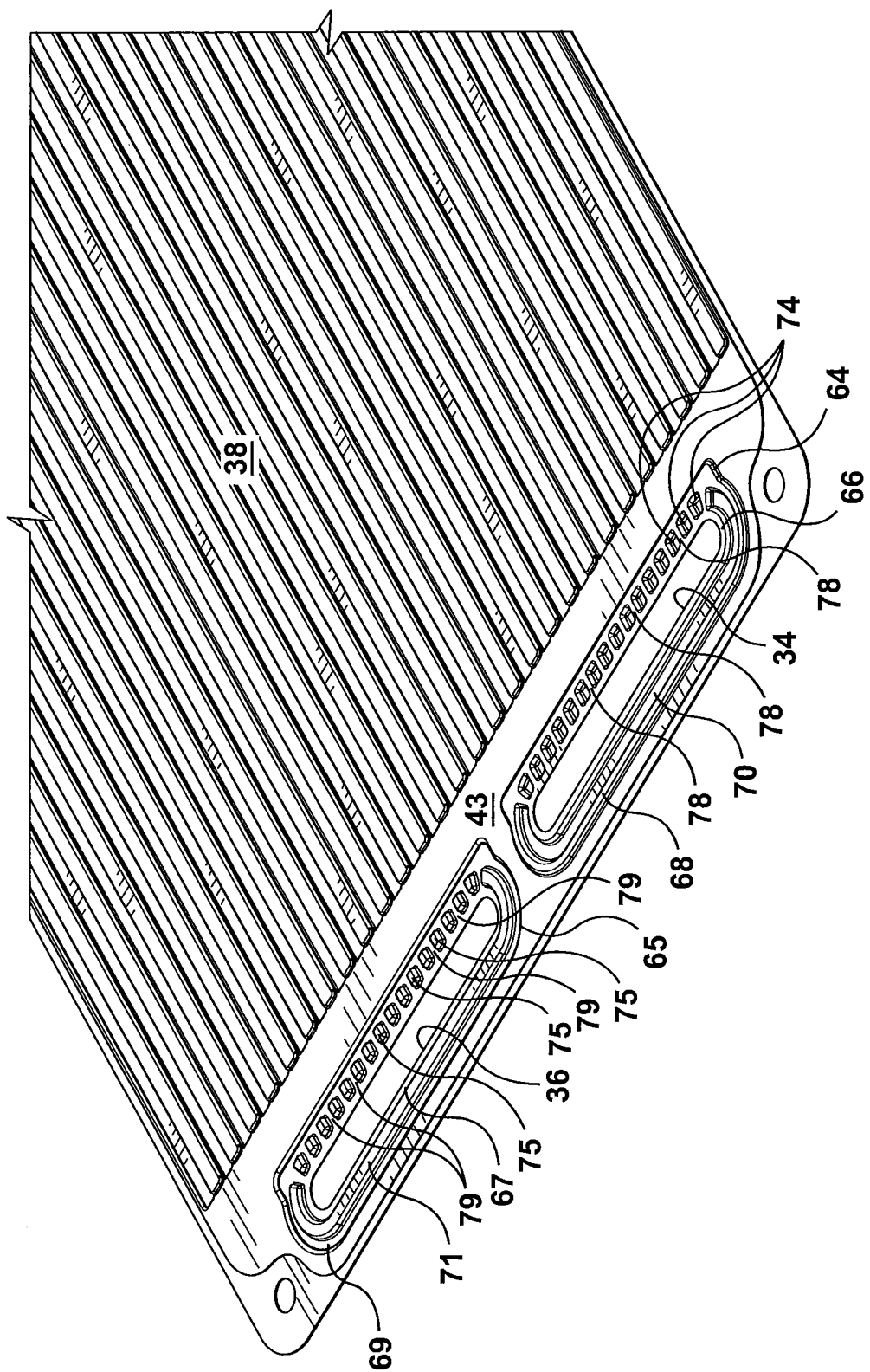
FIG. 4 is a detail view of one end of the intermediate plate of FIG. 3.
Figure 6:
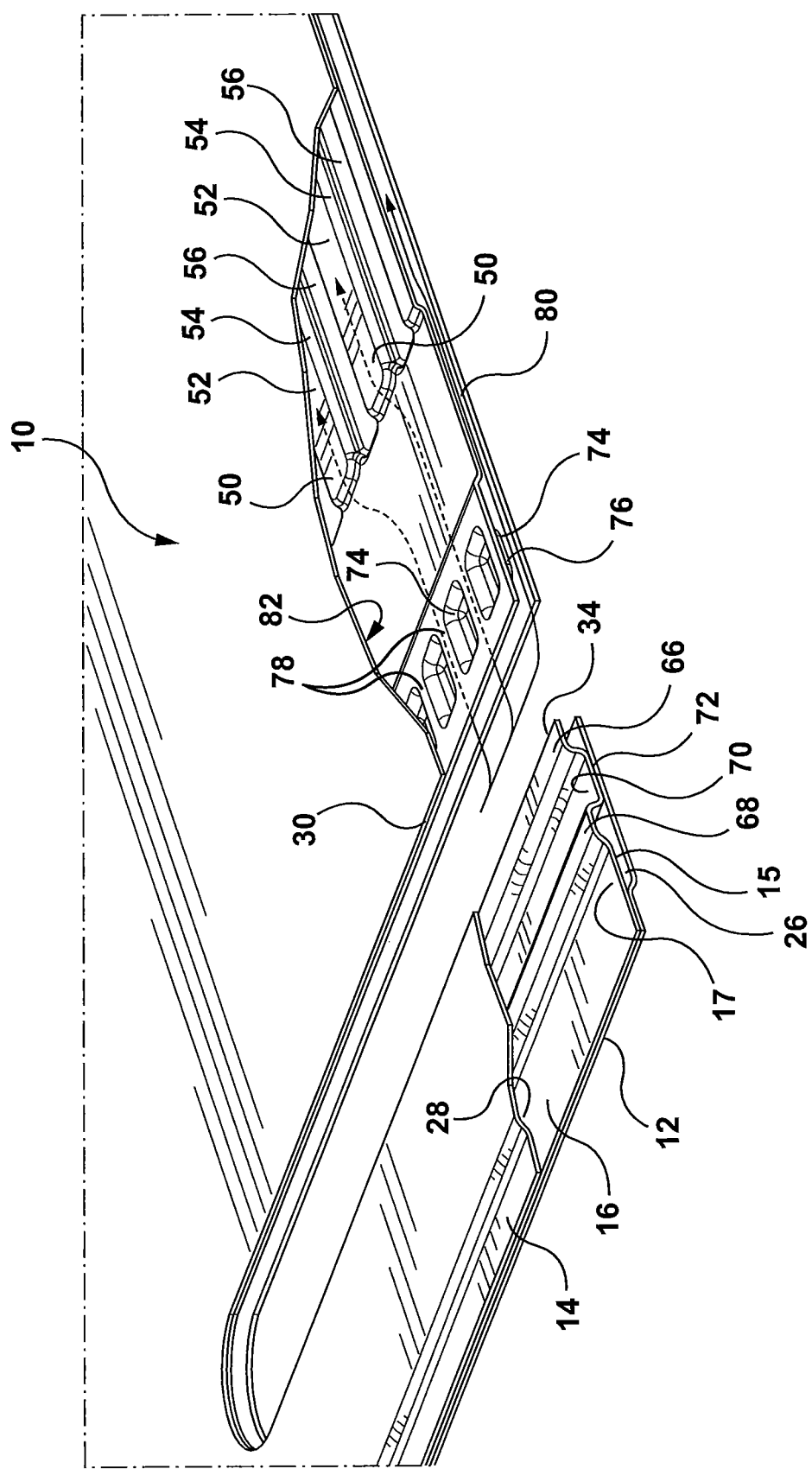
FIG. 6 is a detail, perspective view of a portion of the heat exchanger of FIG. 1 taken along a longitudinal section line through the inlet manifold with a portion of the top plate being removed and including schematic flow directional lines.
Figure 6A:
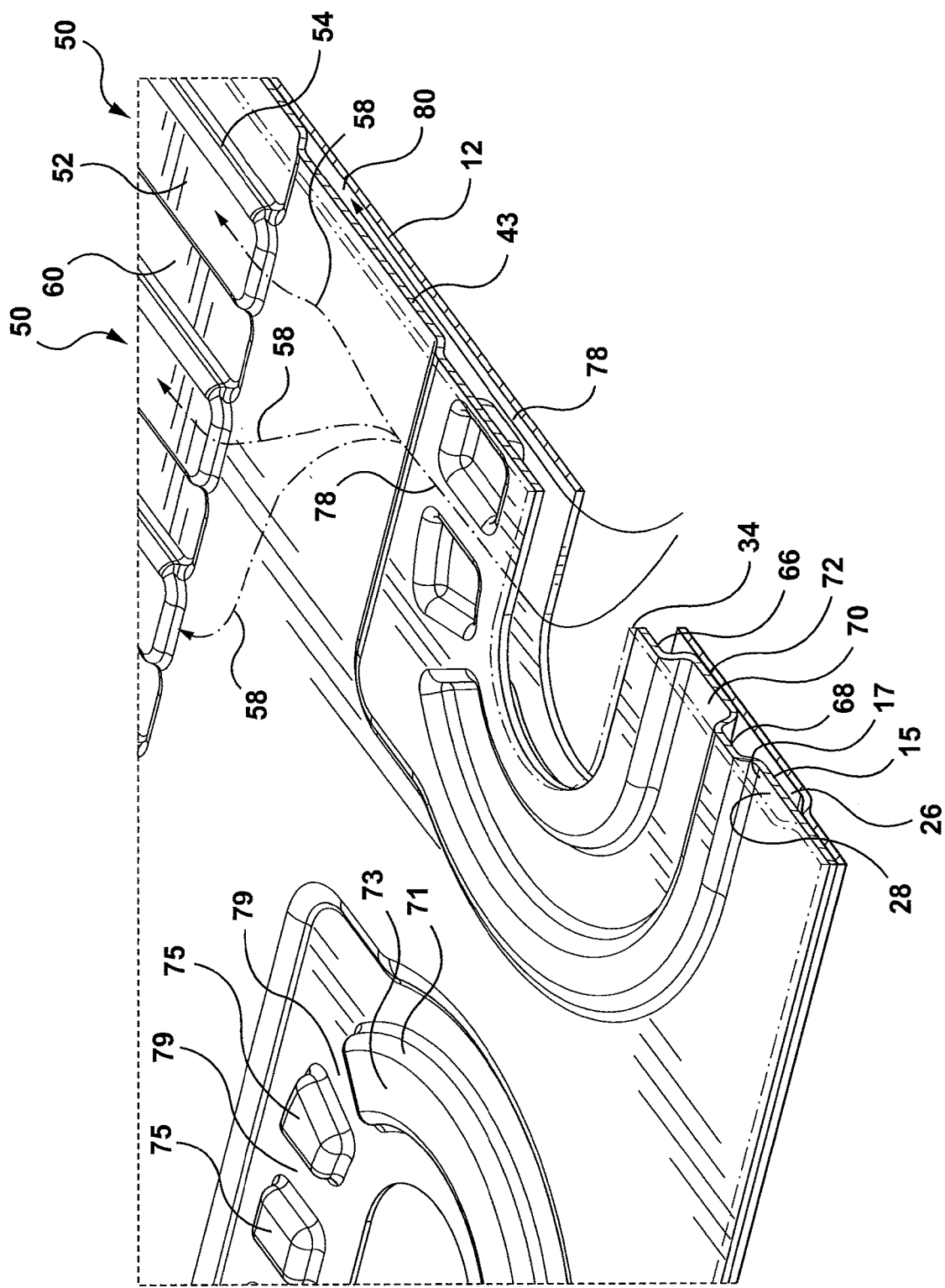
FIG. 6A is a detail, perspective view of a portion of the heat exchanger of FIG. 1 taken along a longitudinal section line through the inlet manifold with the top plate being made transparent and including schematic flow directional lines.

The inlet and outlet manifold openings 34, 36 will now be described in further detail in reference to FIGS. 4-6. Inlet and outlet manifold openings 34, 36 are formed in respective bosses or embossments 64, 65 that are generally identical to each other, however, with one of the embossments 64, 65 being oppositely disposed or inverted with respect to the other 64, 65. More specifically, when considering the top-down view of the example embodiment of intermediate plate 16 as shown in FIG. 3 or 4, embossment 64 projects upwardly, out of the plane of the peripheral flange 40 while embossment 65 is formed as a depression and therefore projects downwardly away from the plane of the peripheral flange 40. The inlet and outlet manifold openings 34, 36 therefore each having a sealing or contact surface 66, 67 formed around the corresponding opening 34, 36 on opposite sides of the intermediate plate 16 for sealing against the corresponding surface of the corresponding outer plate 12, 14 when the plates 12, 14, 16 are assembled or sandwiched together to form the heat exchanger 10. A second sealing or contact surface 68, 69 is also formed as part of embossments 64, 65, the second sealing surface being spaced apart from the corresponding opening 34, 36 and first contact surface 66, 67 by trough regions 70, 71. Trough regions 70, 71 only partially surround the corresponding manifold inlet or outlet opening 34, 36 and first contact surface 66, 67 and defines a further sealing or contact surface 72, 73 for contacting and sealing against a corresponding portion of the corresponding outer plate 12, 14 when the plates 12, 14, 16 are assembled together. Additionally, by providing first and second contact or sealing surfaces 66, 67, 68, 69 that are spaced apart by respective trough regions 70, 71 with corresponding sealing or contact surfaces 72, 73 being provided on the opposite side of intermediate plate 16 as the corresponding first and second sealing surfaces 66, 67, 68, 69, the embossments 64, 65 provide an overall through plane stiffness to support a face-to-face seal between the intermediate plate 16 and outer plates 12, 14 for the connection of the corresponding cooling ports. Therefore, while inlet and outlet manifold openings 34, 36 and their respective bosses 64, 65, sealing surfaces 66, 67, 68, 69 and trough regions 70, 71 with sealing surfaces 72, 73, etc. are similar in structure, it will be understood that the features of one are oppositely disposed with respect to the corresponding features of the other as shown in the detail views of FIGS. 4, 5, 6A, for example.

A plurality of protrusions 74, 75 in the form of dimples, for example, is formed along an edge of the corresponding manifold opening 34, 36. The protrusions 74, 75 are spaced apart from each other, the protrusions 74 associated with the inlet manifold opening 34 being formed as depressions so as to extend downwardly into the first gap 26 formed between the intermediate plate 16 and the corresponding surface of the first outer plate 12. The protrusions 75 associated with the outlet manifold opening 36 project upwardly into the second gap 28 formed between the intermediate plate 16 and the corresponding surface of the second outer plate 14. Each of the protrusions 74 therefore defines a contact or sealing surface 76 for sealing against a corresponding portion of the first outer plate 12, each of the individual sealing surfaces 76 therefore lying generally in the same plane as the contact or sealing surface 72 defined by trough region 70. Each of protrusions 75 also defines a contact or sealing surface 77 that lies generally in the same plane as the contact or sealing surface 73 defined by the corresponding trough region 71. As the protrusions 74, 75 associated with each manifold opening 34, 36 are spaced apart from each other, gaps 78, 79 are formed between the adjacent protrusions 74, 75. Gaps 78, 79 serve as small flow passages that tend to distribute fluid entering the heat exchanger 10 through fluid inlet manifold opening 34 and exiting the heat exchanger 10 through fluid outlet manifold opening 36 to respective manifolding areas 80, 82 formed within heat exchanger 10 on either side of the intermediate plate 16 in the gaps or areas created between the transition area 43 of the intermediate plate 16 and the corresponding surface of the first and second outer plates 12, 14.

Figure 7:
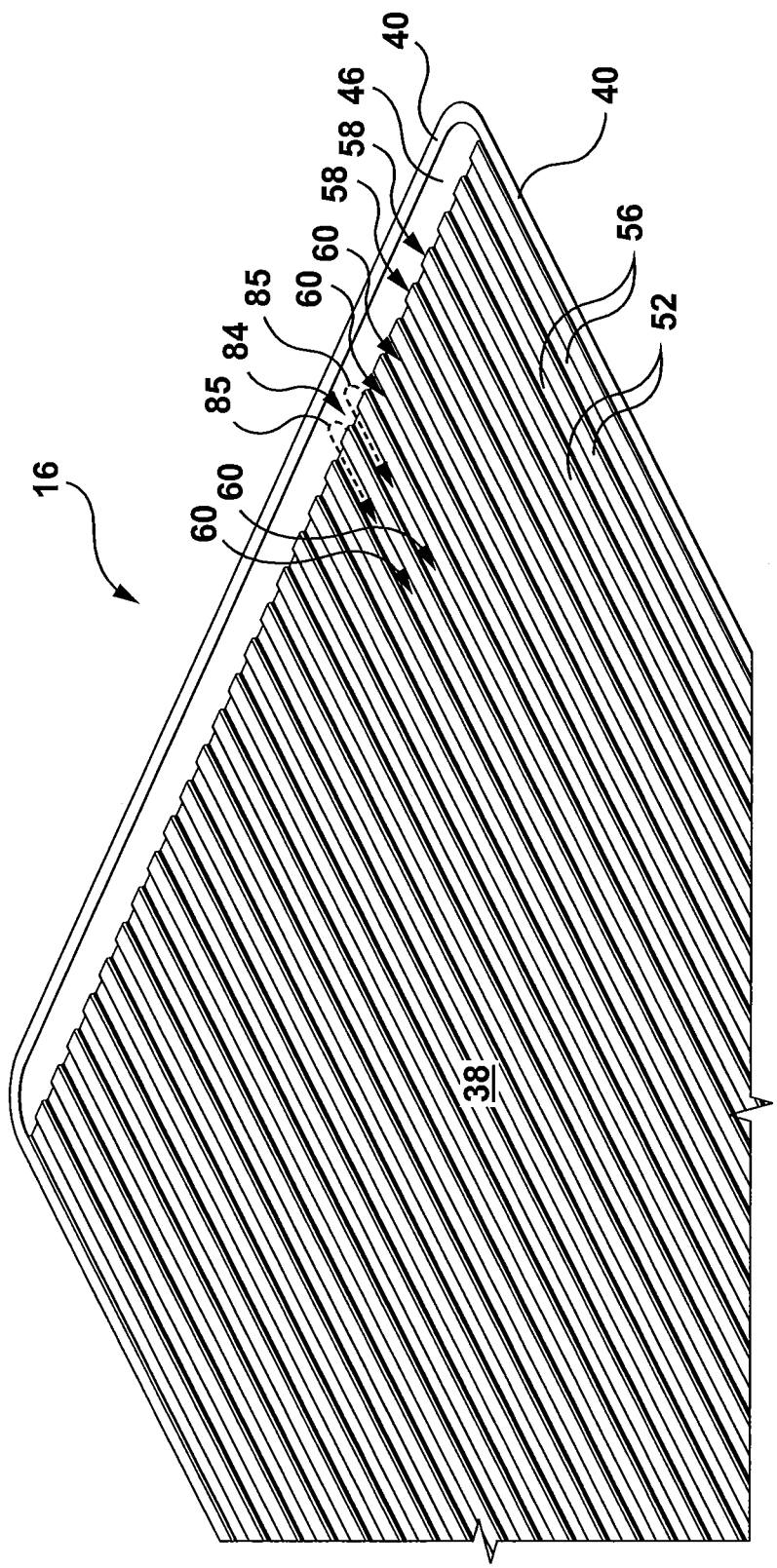
FIG. 7 is a detail, perspective view of the opposite end of intermediate plate shown in FIG. 3.
Figure 7A:
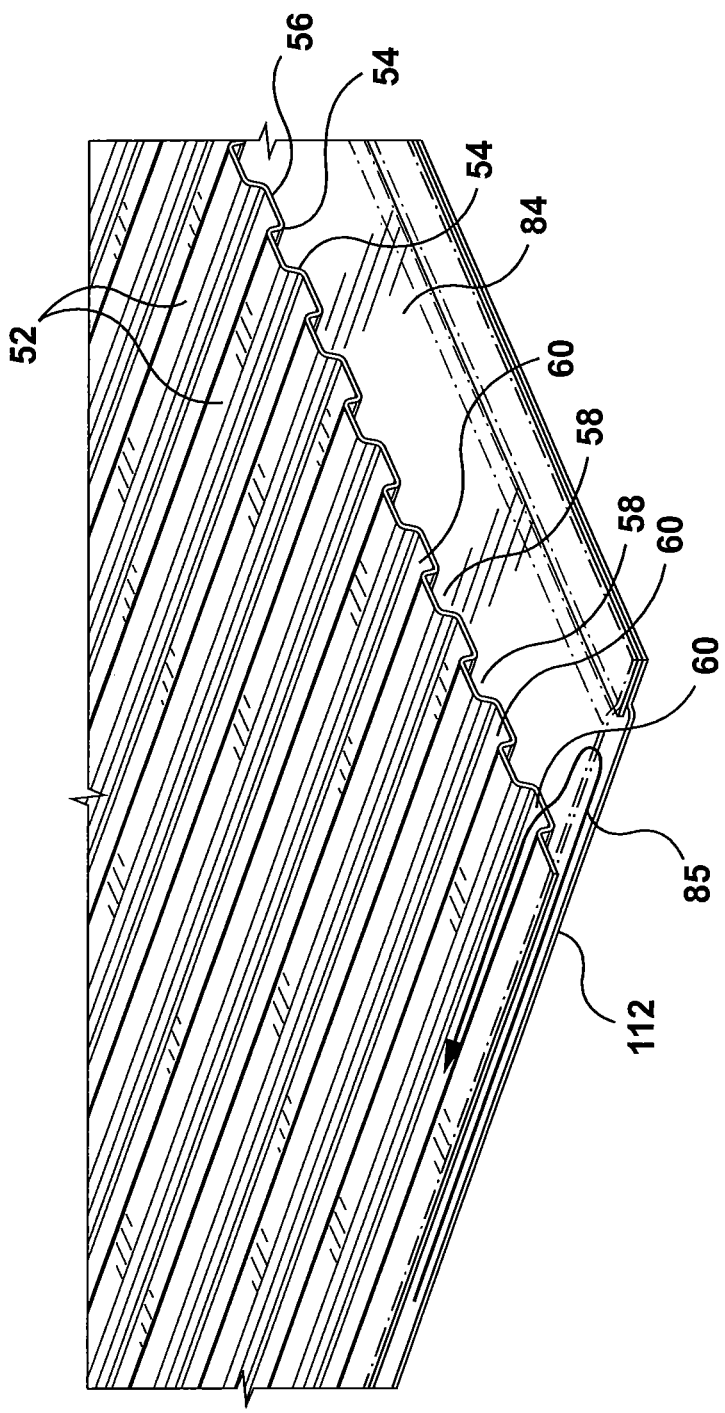
FIG. 7A is a detail, perspective of the end of the heat exchanger as shown in FIG. 7 with the top plate of the heat exchanger being transparent.
Figure 8:
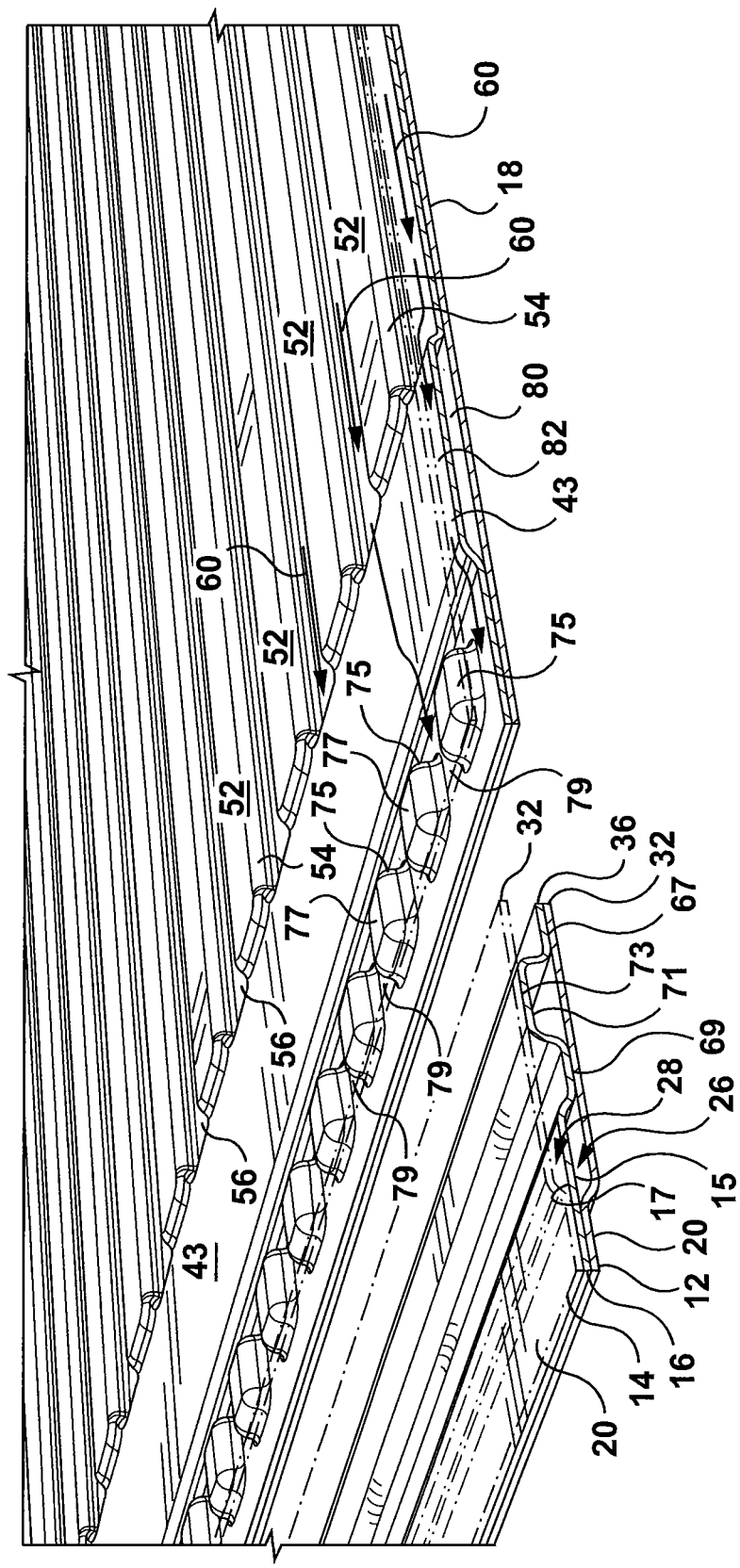
FIG. 8 is a detail, perspective view of the heat exchanger of FIG. 1 taken along a longitudinal section line through the outlet manifold with the top plate of the heat exchanger being transparent.
Figure 9A:
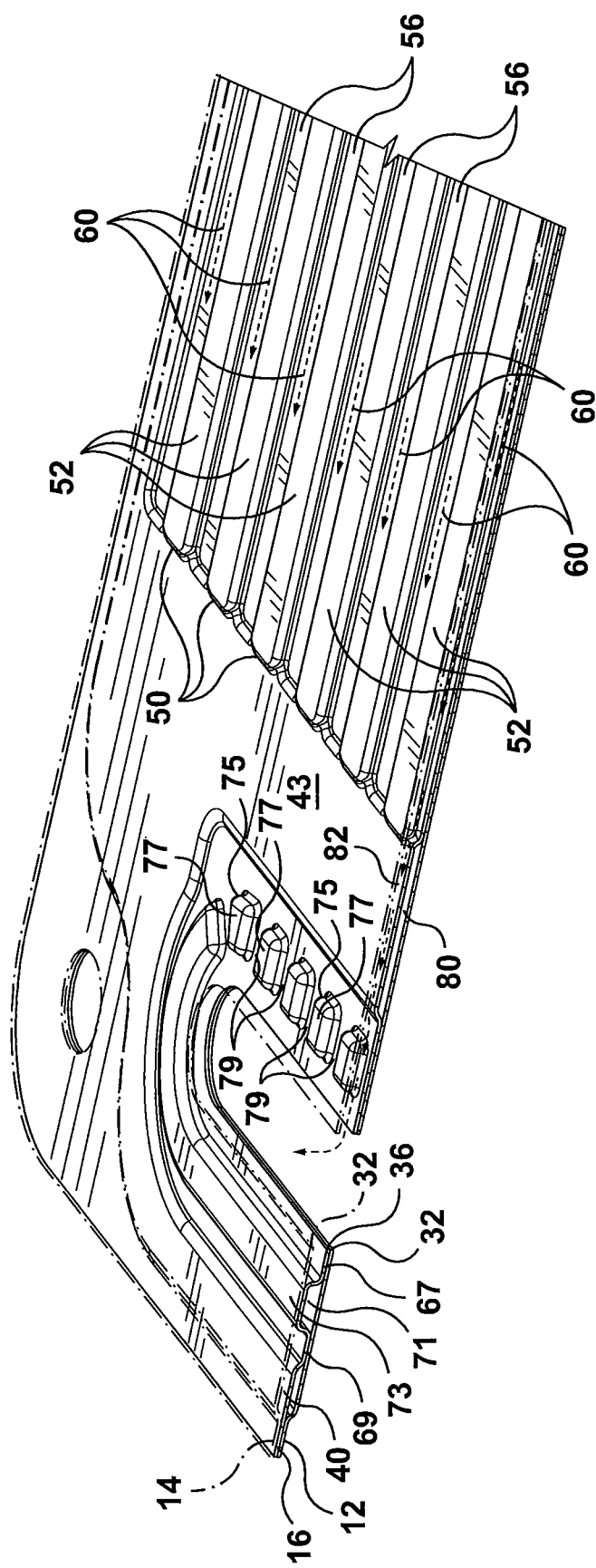
FIG. 9A is another detail, perspective view of the heat exchanger of FIG. 1 taken along a longitudinal section line through the outlet manifold with the top plate of the heat exchanger being transparent and including schematic flow lines illustrating the outflow from the heat exchanger.
Figure 10:
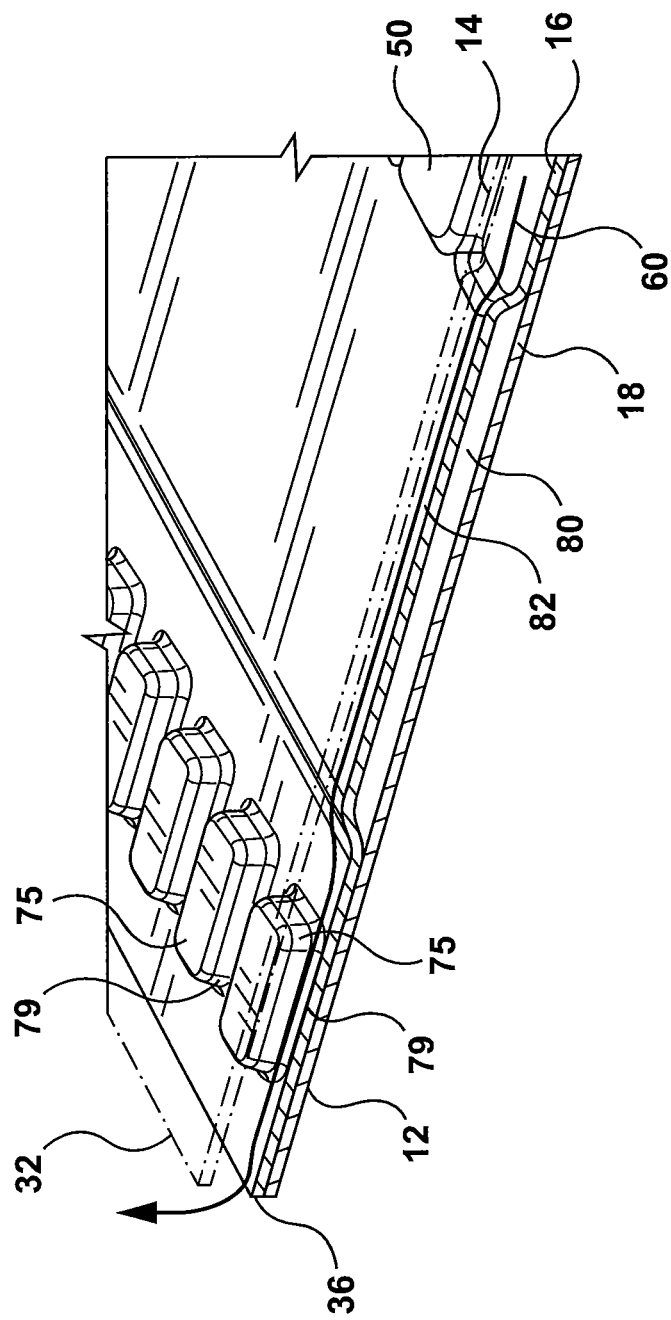
FIG. 10 is a detail perspective view of area 9 of FIG. 9 illustrating the outgoing flow through the heat exchanger.

Since the central, generally planar portion 18 of the first outer plate 12 is spaced apart from the intermediate plate 16 so as to form the first gap 26 therebetween, fluid entering the heat exchanger 10 through the inlet manifold opening 34, flows through openings 30, 34 formed in the second outer plate 14 and intermediate plate 16 that are sealed together at contact surface 66, flows through the gaps 78 formed between the series of protrusions 74 that seal against the first outer plate 12 and into a first manifolding area 80 formed between the transition area 43 of intermediate plate 16 and the corresponding inner surface of the first outer plate 12 where the fluid is then distributed to the first set of flow passages 58 formed between the intermediate plate 16 and the first outer plate 12 by elongated ridges 50. As the fluid travels through the first set of flow passages 58 in a first longitudinal direction the fluid draws heat away from the battery cells or battery cell containers arranged in contact with the primary heat transfer surface(s) or outer surface(s) of heat exchanger 10. Once the fluid travels the length of the first set of flow passages 58, it is delivered to a second manifolding area 84 defined by the open interior space formed between the first and second outer plates 12, 14 through the open manifold channel 46 formed in intermediate plate 16. See for instance FIG. 7. The second manifolding area 84 fluidly interconnects the first set of flow passages 58 and the second set of flow passages 60 allowing fluid exiting the first flow passages 58 to enter the adjacent second flow passages 60. The second manifolding area 84 allows the fluid flowing through the heat exchanger 10 to turn 180 degrees (e.g. switch-back) and flow through the second flow passages 60 along the central generally planar area 38 of the intermediate plate 16 in a second flow direction that is generally opposite to the first flow direction through the first flow passages 58. The U-flow that is created in the second manifolding area 84 is illustrated in further detail in FIG. 7 by flow directional arrows 85. As shown, the fluid flows through the first flow passages 58 and then forms a U-turn in the second manifolding area 84 before flowing through the second flow passages 60. Accordingly, the alternating arrangement of the first and second flow passages 58, 60 across the width of the heat exchanger 10 creates a two-pass flow path for the fluid travelling through the heat exchanger 10. When the heat exchanger 10 is used for cooling, for example, the fluid enters the heat exchanger 10 at a low temperature and gradually increases in temperature as it flows along the length of the first flow passages 58 as the fluid draws heat away from the battery cells or battery cell containers associated with the heat exchanger. Accordingly, the temperature of the fluid exiting the first flow passages 58 is higher than the temperature of the fluid entering the first flow passages 58, the fluid travelling though the second set of flow passage 60 therefore is warmer in temperature than the fluid travelling through the first set of flow passages 58 having already completed a pass through the heat exchanger. By having the second fluid passages 60 interleaved with the first flow passages 58 by way of their alternating arrangement across the central generally planar area 38 of the intermediate plate 16, the warmer fluid in the second flow passages 60 is brought into thermal contact with the lower temperature fluid travelling through the first set of flow passages 58 allowing heat transfer to occur between the two sets of flow passages 58, 60 across the surface of the heat exchanger 10. Bringing the warmer fluid in the second set of flow passages 60 into thermal contact or heat transfer relationship with the fluid in the first set of flow passages 58 helps to counteract any temperature differential across the primary heat transfer surface of the heat exchanger 10 which, in turn, helps to ensure appropriate thermal management of the battery cells or battery cell containers arranged in thermal contact with the heat exchanger 10. As well, the close proximity of the first and second sets of flow passages 58, 60 and the arrangement of the intermediate plate 16 being sandwiched between and in thermal contact with both the first and second outer plates 12, 14 allows for in-plane thermal conduction along the surface of the outer plates 12, 14 which also contributes to a more uniform surface temperature across the heat exchanger 10.

Once the fluid flowing through the heat exchanger 10 has completed its pass through the second set of flow passages 60, the fluid exits the second flow passages 60 and enters the third manifolding area 82 formed between the transition area 43 of intermediate plate 16 and the second outer plate 14. The third manifolding area 82, therefore is in fluid communication with the second flow passages 60 and is also in fluid communication with the outlet manifold opening 36 via gaps 79 formed between the plurality of protrusions 75.

While the above example embodiment has been described with the first fluid flow passages being formed in the first gap between the first side 15 of intermediate plate 16 and the first outer plate 12 and with the second fluid flow passages being formed in the second gap 28 formed between the second side 17 of intermediate plate 16 and the second outer plate 14 with each of the first fluid flow passages and second fluid flow passages being in fluid communication with their respective inlet or outlet manifold opening 34, 36, it will be understood that the first and second fluid flow passages and inlet and outlet manifold openings 34, 36 could have the opposite configuration and that the above described fluid flow path through the heat exchanger 10 could be reversed depending on the particular application and/or desired location of the particular inlet/outlet fluid connections, as would be understood by persons skilled in the art.

Since the alternating arrangement of the first and second flow passages 58, 60 across a single plane of the heat exchanger 10 allows for heat transfer to occur between the adjacent first and second flow passages 58, 60, any temperature differential between the fluid entering the heat exchanger 10 and flowing through the first flow passages 58 and the fluid exiting the heat exchanger 10 via the second flow passages 60 is somewhat mitigated by the heat transfer between the adjacent flow passages 58, 60 and through in-plane conduction in the top and bottom outer plates 12, 14. Accordingly, a more consistent temperature profile across the outer surface or primary heat transfer surface of the heat exchanger 10 may be achieved which is generally preferred or considered desirable in battery thermal management applications.

In some embodiments, the first and second flow passages 58, 60 may be provided with heat transfer enhancement features, such as a series of spaced apart dimples or tabs formed along the side walls or side portions 54 and/or top or bottom portions 52, 56 that together form the individual corrugations 50 in the central, generally planar are 38 of the intermediate plate 16. If desired, the dimples or tabs would be formed on side portions 54 and/or top and bottom portions 52, 56 so as to project into the corresponding fluid flow passages 58, 60 without interfering with the top or bottom portions 52, 56 that are brazed or otherwise joined to outer plates 12, 14. In some embodiments rather than having heat transfer enhancement features formed as part of the surface of intermediate plate 16, separate fins or turbulizers could also be provided and positioned within each of fluid flow passages 58, 60.

Figure 11:
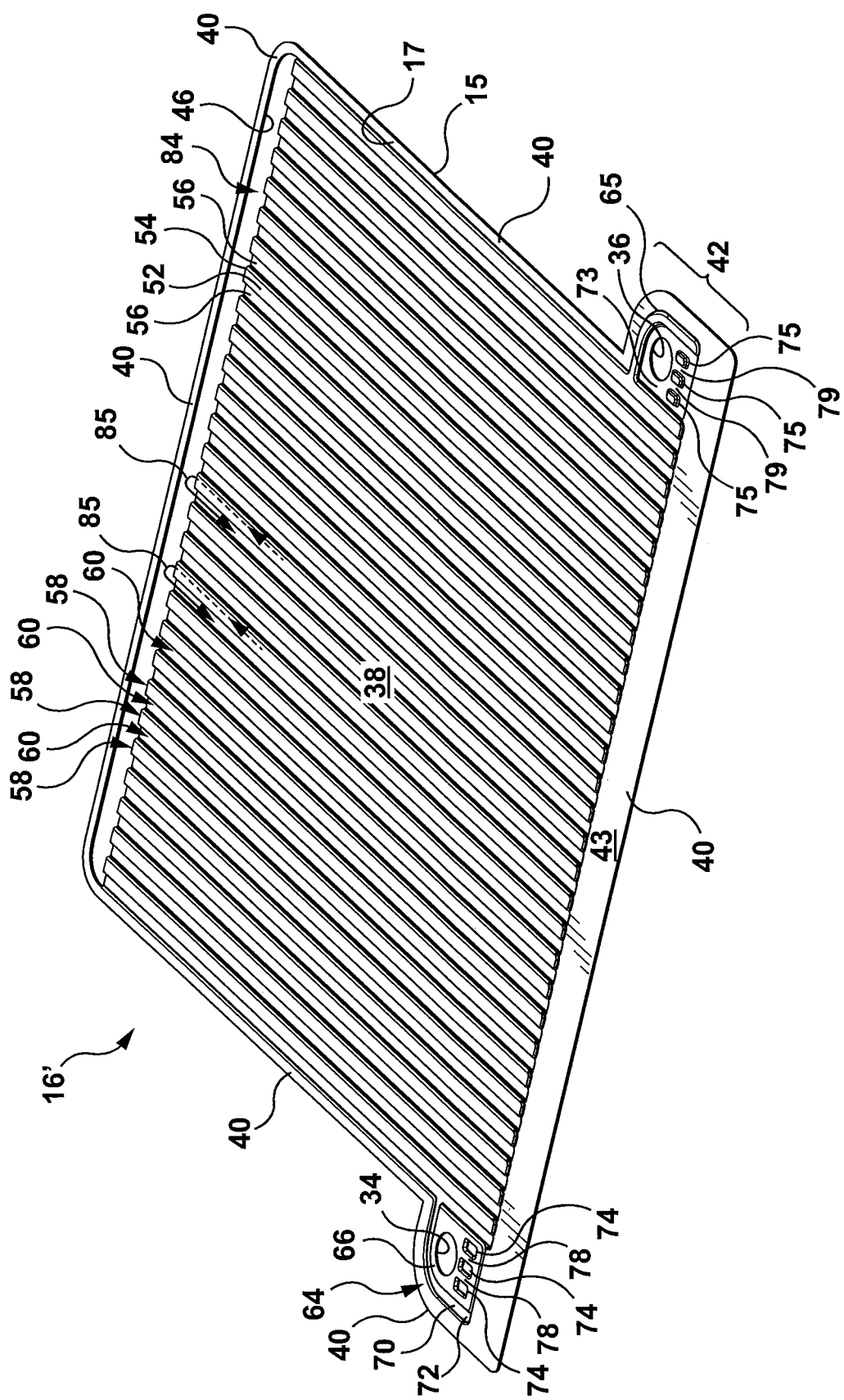
FIG. 11 is a perspective view of an alternate intermediate plate of another example embodiment of the heat exchanger.
Figure 12:
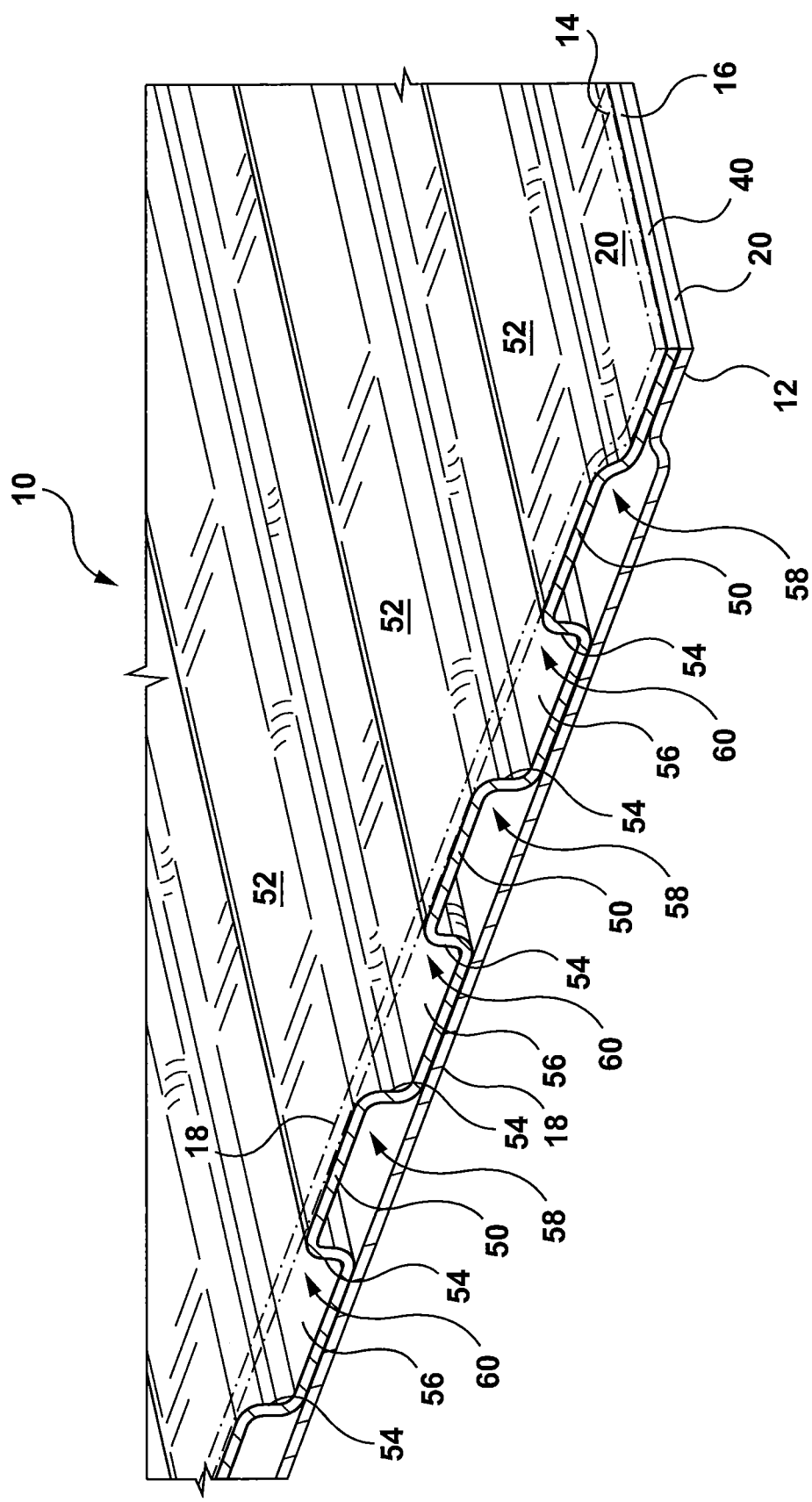
FIG. 12 is a detail perspective view of a portion of the heat exchanger of FIG. 1 taken along a section line extending across the width of the heat exchanger.
Figure 13:
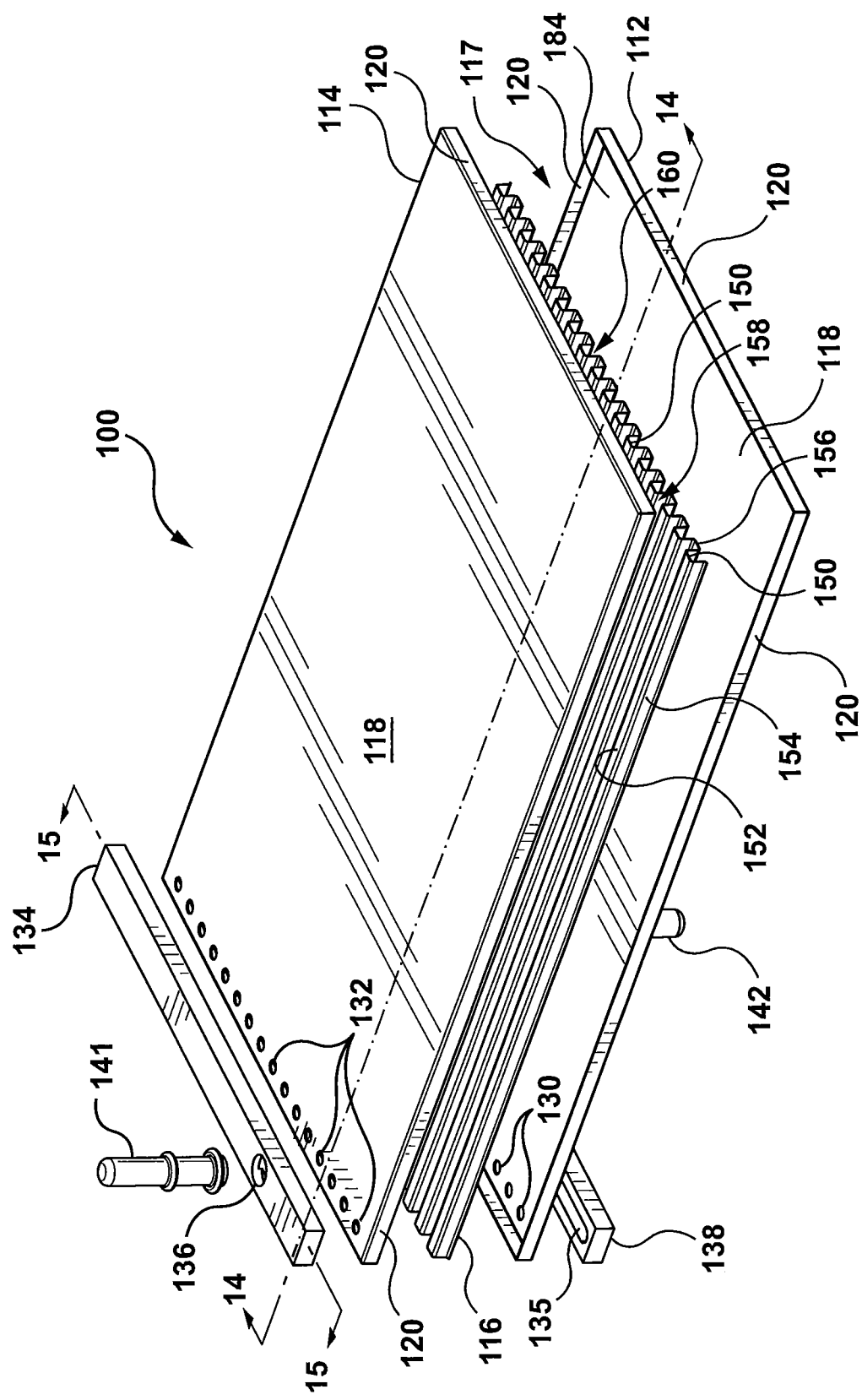
FIG. 13 is an exploded, perspective view of a heat exchanger according to another example embodiment of the present disclosure.
Figure 14:
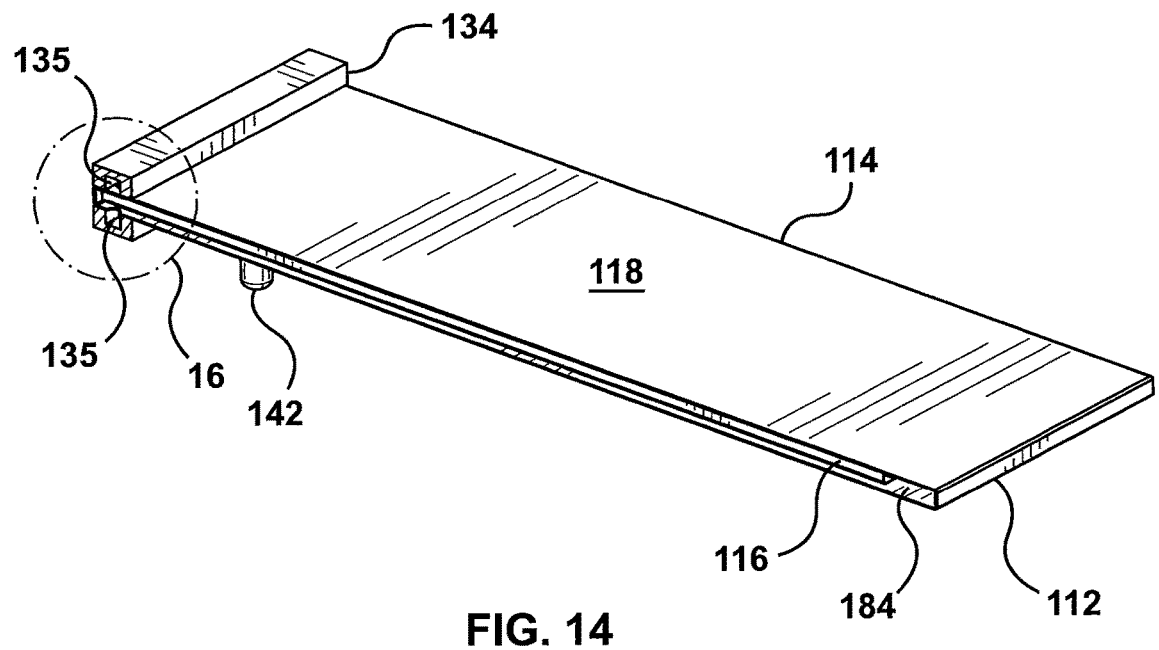
FIG. 14 is a cross-sectional view of the assembled heat exchanger of FIG. 13 taken along the longitudinal axis of the heat exchanger or section line 14-14 of FIG. 13.
Figure 15:
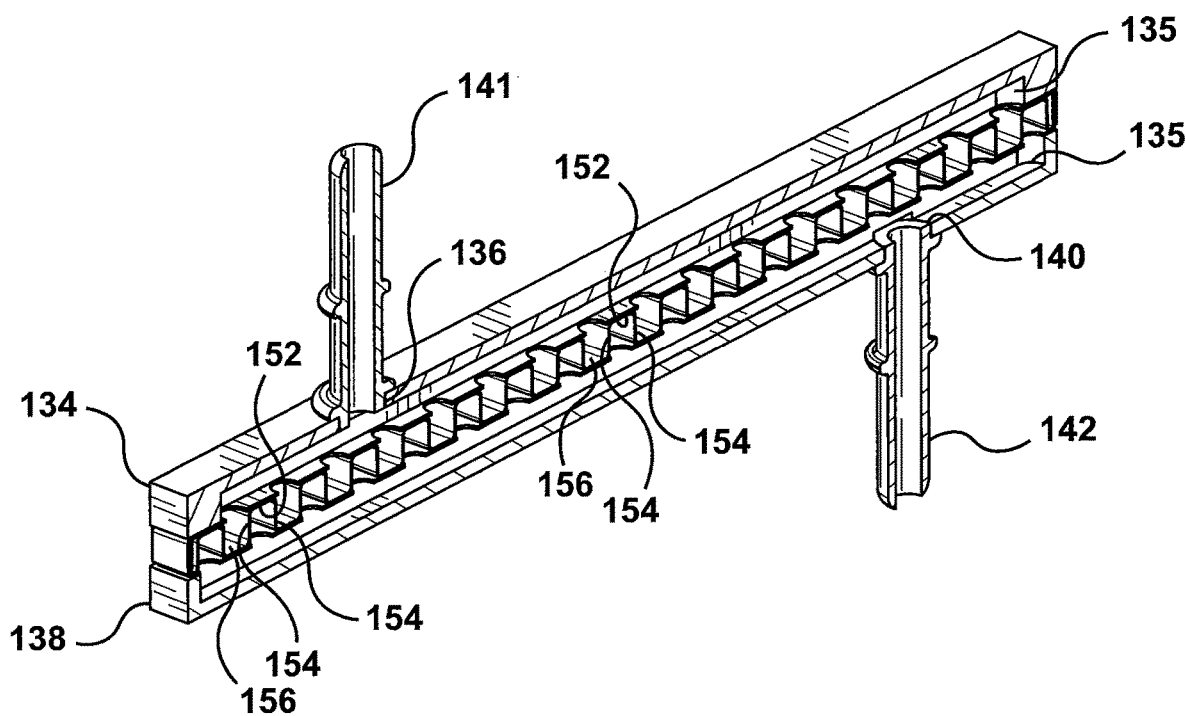
FIG. 15 is a cross-sectional view of the manifold region of the heat exchanger taken along section line 15-15 shown in FIG. 13.
Figure 16:
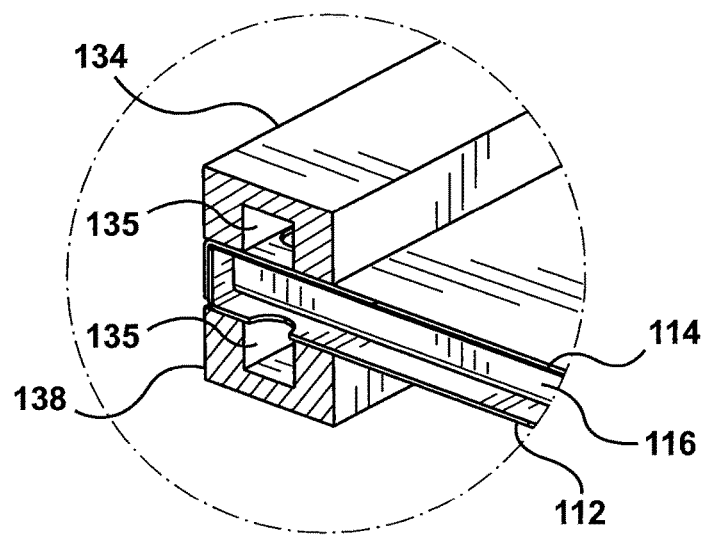
FIG. 16 is a detail view of the encircled region of FIG. 14.

Referring now to FIG. 11 there is shown an alternate embodiment of intermediate plate 16' wherein like reference numerals have been used to identify similar features as described above in connection with FIGS. 1-10. As shown in the FIG. 11, rather than having the inlet and outlet manifold openings 34, 36 arranged at one of the opposed ends of the intermediate plate 16, the inlet and outlet manifold openings 34, 36 are instead arranged one on either side of the central, generally planar area 38 of intermediate plate 16'. Accordingly, in the subject embodiment the intermediate plate 16' has a somewhat T-shaped foot print with the inlet and outlet manifold openings 34, 36 and corresponding embossments 64, 65 projecting outwardly from the edges of the central, generally planar area 38 of the plate 16'. Although not shown in the drawings, it will be understood that in the subject embodiment, outer plates 12, 14 would have a similar T-shaped foot print in order to correspond to the foot print of the intermediate plate 16' when the plates 12, 14, 16' are assembled together to form the heat exchanger 10.

The central, generally planar area 38 of intermediate plate 16' remains essentially unchanged in that it is provided with a series of corrugations or elongated ribs or ridges 50 forming the first and second sets of fluid flow passage 58, 60 that alternate across the central generally planar area 38 of the plate 16. However, rather than having the transitional area 43 arranged intermediate the inlet and outlet openings 34, 36 and the corrugated area 38 as in the previously described embodiment, the transitional area 43 is arranged along the end 42 of intermediate plate 16' and extends beyond the width of the central, generally planar area 38 of the intermediate plate 16' interconnecting with the respective embossments 64, 65 that form the inlet and outlet manifolds. The transitional area 43 therefore extends into and forms part of the peripheral flange 40 that defines the perimeter of the intermediate plate 16'.

As in the previously described embodiment, the inlet manifold opening 34 is formed in embossment 64 that projects upwardly away from the plane of the peripheral flange 40, the inlet manifold opening 34 therefore being surrounded by first contact surface 66 which seals against the corresponding surface of corresponding outer plate 14. Trough region 70 partially surrounds contact surface 66, trough region 70 defining a corresponding contact or sealing surface 72 on the opposite side thereof for sealing against the corresponding surface of outer plate 14. In the subject embodiment, the second sealing surface 68 does not lie in the same plane as the first contact surface 66 (as in FIG. 5) but instead forms part of the peripheral flange 40 which lies in a plane parallel to but below the first sealing surface 66. A series of spaced apart dimples or projections 74 are formed along one edge of the manifold inlet opening 34 that project downwardly into the first gap 26 formed between the first outer plate 12 and the corresponding surface 15 of the intermediate plate 16, each of the dimples or projections defining a contact surface 76 for sealing against outer plate 12. Gaps or flow spaces 78 are formed between the spaced apart projections 74 which provide fluid communication between the manifold inlet opening 34 and the first manifolding area 80 formed between the transitional area 43 and the corresponding surface of outer plate 12, the first manifolding area 80 directing the incoming fluid or coolant flow to the first set of fluid flow passages 58 formed underneath each of the elongate ribs 50 and outer plate 12.

The opposite end 44 of intermediate plate 16' is essentially identical to the previously described embodiment comprising elongate opening or channel 46, the intermediate plate 16' and outer plates 12, 14 thereby forming an open, interior space or manifolding area 84 that fluidly interconnects the outlet ends of fluid flow passages 58 and the inlet ends of fluid flow passages 60 creating the U-flow that results in the counter-flow arrangement between fluid flow passages 58, 60.

Once the fluid or coolant travelling back through the second set of fluid flow passages 60 completes the second pass through the heat exchanger, it is discharged from the second fluid flow passages 60 into the third manifolding area 82 formed between transitional area 43 of intermediate plate 16' and the corresponding surface of the second outer plate 14. From the third manifolding area 82, the fluid or coolant is directed to manifold outlet opening 36 formed at the opposite side of the heat exchanger 10. Manifold outlet opening 36 is formed in embossment 65 which is essentially identical to, but oppositely disposed with respect to embossment 64. Accordingly, embossment 65 forms first sealing surface 67 surrounding opening 36 on the first side 15 of intermediate plate 16' for contacting and sealing against the corresponding surface of the first outer plate 12. Trough region 71 partially surrounds the first sealing surface 67 and defines a sealing or contact surface 73 on the opposite side thereof for sealing against the corresponding surface of the second outer plate 14. As with the inlet manifold opening 34, the second sealing surface 69 does not lie in the same plane as the first sealing surface 67 but instead extends into and forms part of the peripheral flange 40 that forms the perimeter of the intermediate plate 16' which lies in a plane generally parallel to but in between the plane defined by the first sealing surface 67 and the sealing surface 73 formed by trough region 71.

In order to form heat exchanger 10 using intermediate plate 16', corresponding outer plates 12, 14 having a corresponding foot print are provided with the plates 12, 14, 16' being sandwiched together in the same manner as described above to form heat exchanger 10, outer plates 12, 14 therefore enclosing and forming the first and second fluid flow passages 58, 60 when stacked together with intermediate plate 16'.

In use, for a heat exchanger 10 formed using either intermediate plate 16 or alternate intermediate plate 16', the central, generally planar portion 18 of outer plates 12, 14 may each serve as a primary heat transfer surface or primary heat transfer area against or upon which the individual battery cells, or battery cell containers that house the individual battery cells, are positioned/placed. In the case of a cold plate heat exchanger where a plurality of individual battery cells, or individual battery cell containers that house the individual battery cell, are stacked upon the cold plate heat exchanger, only one central, generally planar portion 18 of the corresponding outer plate 12, 14 serves as the primary heat transfer surface (or area) and the thicknesses of the individual plates 12, 14, 16 may be adapted to ensure specific requirements for a cold plate application are met. In the case of an inter-cellular arrangement (ICE plate heat exchanger) where a plurality of individual heat exchangers 10 are provided and arranged in between adjacent battery cells or adjacent battery cell containers, both of the central, generally planar portions 18 will function as primary heat transfer surfaces (or areas) as both surfaces are in contact with and in heat transfer relationship with the adjacent battery cell or battery cell container. Once again, the particular thickness of the individual plates 12, 14, 16 (16') and the particular size (e.g. width, length) of the first and second flow passages 58, 60 can be adapted to suit the particular application.

By having the outer plates 12, 14 formed with central, generally planar portions 18 that are typically free of surface interruptions and that provide a generally flat, surface area is also particularly suited to battery thermal management applications as the heat exchanger 10 provides adequate surface area that can achieve appropriate surface-to-surface contact with the batter cells or battery cell containers. As well, by having outer plates 12, 14 generally identical to each other with one of the outer plates 12, 14 being inverted with respect to the other of the outer plates 12, 14 when arranged together with the intermediate plate 16, 16' manufacturing of the heat exchanger 10 is somewhat simplified as only a single die is required in order to form both outer plates 12, 14 when formed by stamping, for example, while a second die is required to form intermediate plate 16. In instances where the outer plates 12, 14 may be formed as flat plates using a cutting process with a separate frame member providing the fluid tight seal with intermediate plate 16 (16'), only a single die would be required to form the intermediate plate 16 (16'). By using only a single die to form two separate parts (e.g. outer plates 12, 14) or using only a single die overall (e.g. to form intermediate plate 16, 16' with outer plates 12, 14 being formed by a cutting process), manufacturing and/or tooling costs associated with the overall manufacturing of the heat exchanger 10 can be reduced.

Referring now to FIGS. 13-16 there is shown another example embodiment of a battery cooling counter-flow heat exchanger 100 according to the present disclosure. As in the previously described embodiment, heat exchanger 100 is comprised of a pair of outer plates 112, 114 each having a central, generally planar portion 118 each of which may serve as a primary heat transfer surface of the heat exchanger 100 for contacting the corresponding battery cell(s) or battery cell container(s) that are either stacked upon or arranged adjacent to and in contact with the surfaces 118 of the heat exchanger 100. A peripheral edge 120 extends generally perpendicular to the central, generally planar portion 118 of the plates 112, 114 and extends around the periphery of the central generally planar portion 118 of each of the plates 112, 114 forming a sidewall. Accordingly, based on the view/orientation shown in FIG. 13, the first or lowermost outer plate 112 has an upstanding sidewall or peripheral edge 120 where the peripheral edge extends upwardly away from the inner surface of the plate 112, while the second or uppermost outer plate 114 has a downwardly depending sidewall where the peripheral edge 120 extends downwardly away from the inner surface of the plate 114. Therefore, when the outer plates 112, 114 are arranged in their mating relationship, the end edges of the peripheral edges 120 of the plates 112, 114 come together forming an open interior space 117 between the spaced apart central, generally planar portions 118 of the respective plates 112, 114.

An intermediate plate 116 is arranged between the first and second outer plates 112, 114 and occupies the majority of the open interior space formed between the mating outer plates 112, 114. The intermediate plate 116 is in the form of a corrugated fin plate comprising a plurality of interconnected convolutions or elongated ridges 150. As in the previously described embodiment, the convolutions or elongated ridges 150 are each comprised of a top surface portion 152 (or "crest") and a pair of side portions 154, the elongated ridges being interconnected by bottom surface portions 156. Accordingly, when the intermediate plate 116 is arranged or sandwiched between the two outer plates 112, 114, the top surface portions 152 come into sealing contact with the corresponding inner surface of the upper or second outer plate 114 while the bottom surface portions 156 come into sealing contact with inner surface of the lower or first outer plate 112. As a result, a first set of flow passages 158 is formed in the spaces provided between each of the elongated ridges 150, i.e. in the gaps formed between the bottom surface portions 156 and the corresponding inner surface of the upper or second outer plate 114, while a second set of flow passages 160 are formed underneath each of the corrugations or elongated ridges 150, i.e. in the gaps between the intermediate plate 116 and corresponding inner surface of the first or lower outer plate 112. While the first set of flow passages 158 has been described as being formed by the gaps between the intermediate plate 116 and the corresponding inner surface of the second or upper outer plate 114 and the second set of flow passages 160 has been described as being formed by the gaps between the intermediate plate 116 and the first or lower outer plate 112, it will be understood that the opposite arrangement is also possible depending on the particular design and/or application of the heat exchanger 100.

The intermediate plate 116 is sized so that its length does not exactly correspond to the length of the open interior space 117 formed between the outer plates 112, 114 thereby providing a manifold area 184 at one end of the heat exchanger 100 wherein fluid travelling through the first fluid channels 158 exits the channels 158 at their downstream or second end which fluid is then transferred to the second set of flow channels 160, the fluid being allowed to turn or "switch-back" through about 180 degrees as it transitions from the first flow channels 158 to the second or return flow channels 160.

For fluid entering the heat exchanger 100, the first and second outer plates 112, 114 are each formed with a row of fluid openings 130, 132 formed across corresponding ends of the plates 112, 114. The rows of fluid openings 130, 132 are formed in the first and second outer plates 112, 114 such that the row of fluid openings 132 formed in the second or upper outer plate 114 are generally aligned with the first flow passages 158 formed between the elongated ridges 150 of intermediate plate 116 while the fluid openings 130 formed in the first or lower outer plate 112 are generally aligned with the second flow passages 160 formed underneath the elongated ridges 150 and the inner surface of the outer plate 112.

A first manifold 134 in the form of an elongated member that, in the illustrated embodiment is generally rectangular in form with an open interior space 135 is arranged over top of the row of fluid openings 130 formed in the upper or second outer plate 114. A fluid opening 136 in the form of an inlet opening provides fluid access to the open interior space 135 of the first manifold 134 wherein the fluid is subsequently transferred to the first fluid passages 158 via fluid openings 130.

A second manifold 138 also in the form of an elongated member that defines an open, interior space 135 is arranged on the outer surface of the first or lower outer plate 112 over top of the row of fluid openings 132 formed therein. A fluid opening 140 (see for instance FIG. 15) in the form of a fluid outlet opening serves to discharge fluid from the heat exchanger 100 once it has traveled through the second set of flow passages 160 to the open interior space 135 of the manifold 138 via openings 132. Appropriate inlet and outlet fittings 141, 142 are arranged within fluid openings 136, 140 of the first and second manifolds 134, 138 to allow appropriate fluid lines to be connected to the heat exchanger 100 as needed.

Since the inlet and outlet manifold structure associated with the heat exchanger 100 is rather simple in structure, manufacturing of the overall heat exchanger 100 is simplified which may result in cost savings. As well, the simplified manifold structure 134, 138 for both the inlet and outlet sides of the heat exchanger 100 reduces the overall area associated with the manifold which tends to allow for larger, generally flat surfaces (i.e. primary heat transfer surfaces) for contacting the corresponding battery cells or battery cell cases that may be stacked thereon or arranged in contact therewith. Therefore the structure of the heat exchanger 100 is suitable for providing large contact surfaces with improved temperature uniformity across the surfaces that serve as the primary heat transfer surfaces of the heat exchanger 100.

While the embodiment shown in FIGS. 13-16 is suitable for applications wherein inlet and outlet fittings 141, 142 are arranged on opposite sides of the heat exchanger 100, the heat exchanger 100 can be modified to provide inlet and outlet fittings on the same side of the heat exchanger as will be discussed in further detail below.

Figure 17:
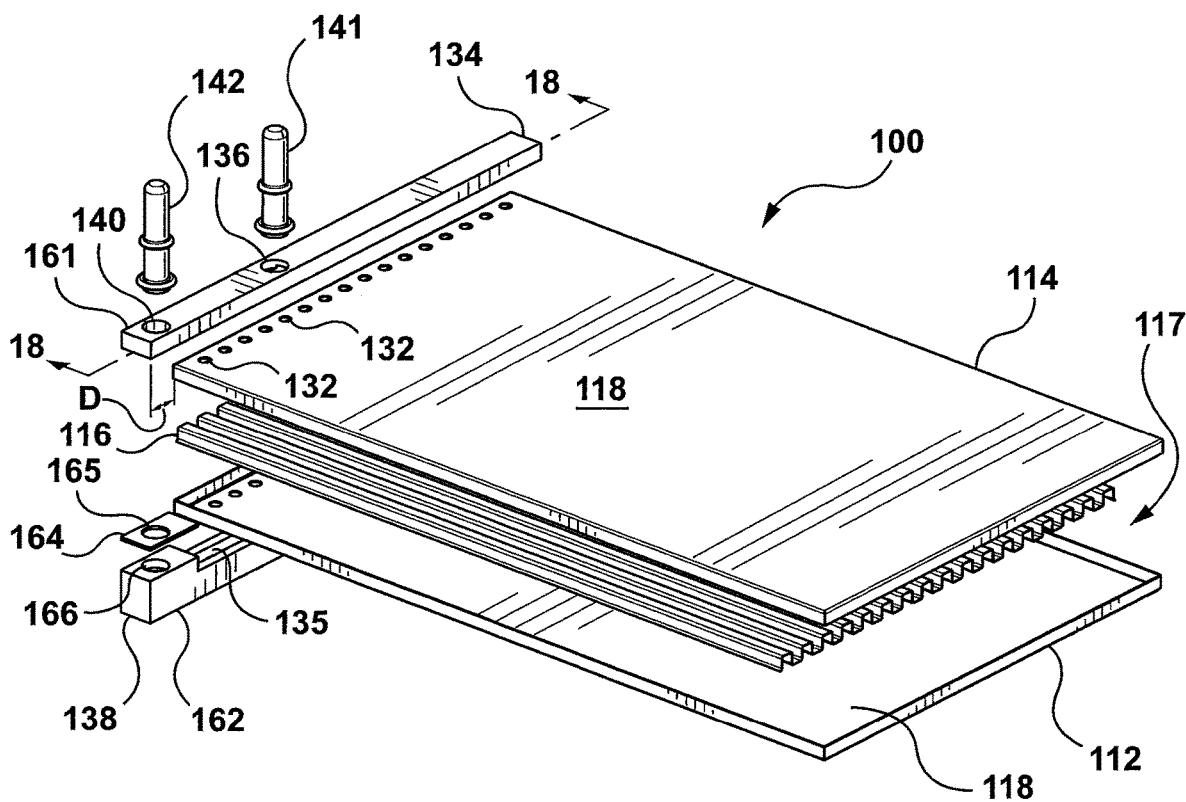
FIG. 17 is an exploded, perspective view of an alternate embodiment of the heat exchanger of FIG. 13.
Figure 18:
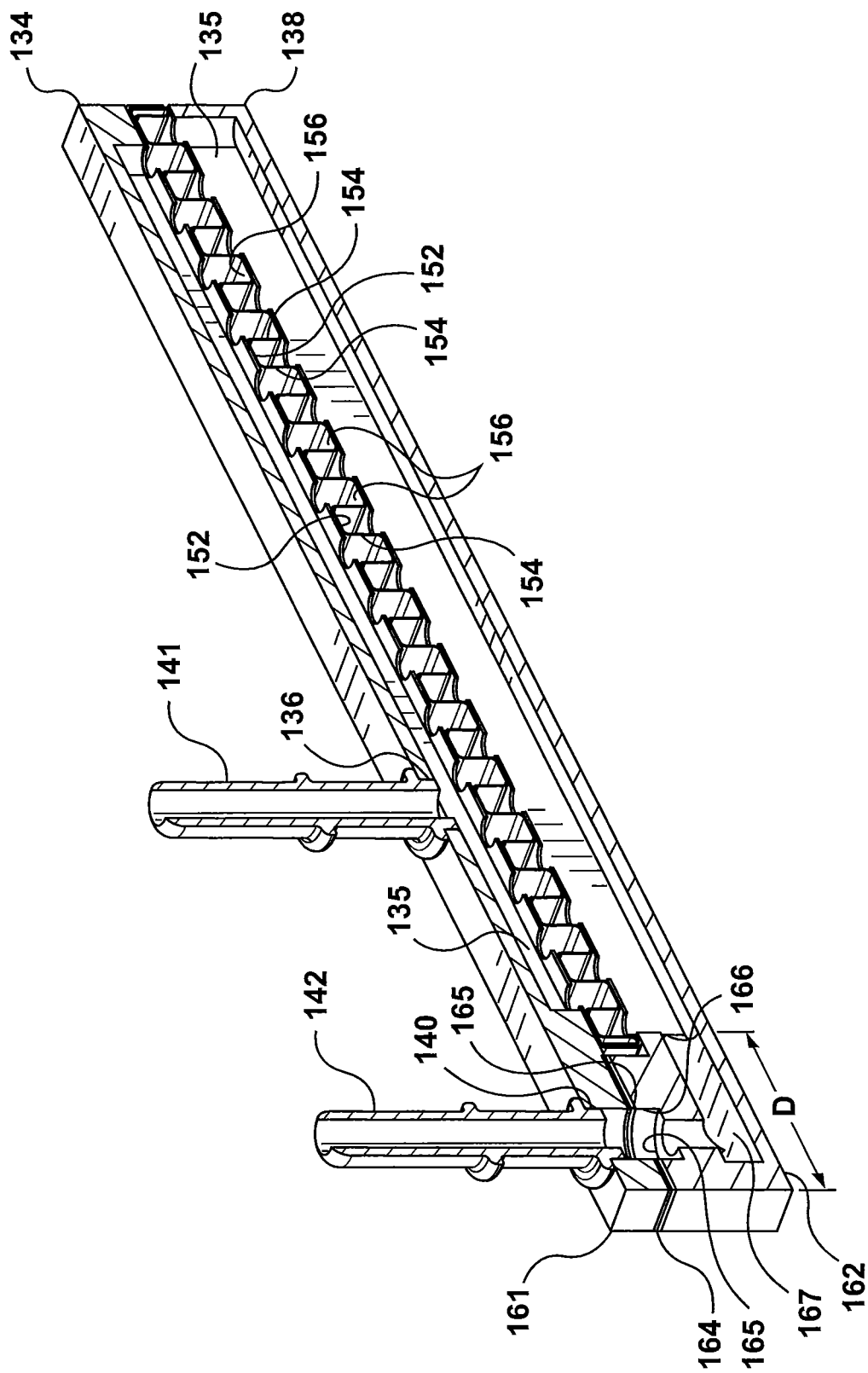
FIG. 18 is a cross-sectional view of the manifold region of the heat exchanger of FIG. 17 taken along section line 18-18.

Referring now to FIGS. 17-18, a modified heat exchanger 100 is shown which is similar in structure to the heat exchanger described above in connection with FIGS. 12-16 in that it too is comprised of outer plates 112, 114 with the corrugated intermediate plate 116 arranged therebetween. The outer plates 112, 114 and the intermediate plate 116 have the same structure as in the previously described embodiment with the intermediate plate 116 forming a first set of flow passages 158 and a second set of flow passages 160 together with the first and second outer plates 112, 114 when the plates are arranged or sandwiched together in their mating relationship.

The first manifold 134 is also in the form of an elongated, generally rectangular member that is arranged over top of the row of fluid openings 132 formed in the upper or second outer plate 114. However, in the subject embodiment, the first manifold 134 extends beyond the width of the plates 112, 114, 116 that form the heat exchanger 100, the manifold 134 therefore having an extension portion 161 that overhangs the edge of the heat exchanger 100 by a distance D. The open interior space 135 formed in the first manifold 134 for distributing fluid to each of fluid openings 130 extends along the length of the first manifold 134 but does not extend into the overhanging portion of the first manifold 134, the open interior space 135 therefore terminating at the corresponding end edges of the heat exchanger 100.

The second manifold 138 also overhangs the edge of the heat exchanger 100(1) by a corresponding distance D, the second manifold 138 also being formed with an extension portion 162 that extends upwardly so as to meet or abut with the corresponding inner surface of the overhanging extension portion 161 of the first manifold 134. An additional sealing member or spacer 164 may be arranged between the opposing contact surfaces of the overhanging portions or extension portions 161, 162 of the first manifold 134 and the second manifold 138 to ensure appropriate contact between the two mating surfaces is achieved along with a fluid tight seal between the two manifold members 134, 138.

As in the previously described embodiment, fluid opening 136 is formed in the first manifold 134 for providing fluid access to the open interior space 135 formed in the first manifold 134 which serves to transmit or distribute incoming fluid to each of the first flow passages 158 via fluid openings 132 formed in the outer plate 114. As the open interior space 135 of the first manifold 134 does not extend into the overhanging portion of the manifold member, fluid opening 136 is arranged at a location somewhere along the length of the open interior space 135 which, in the subject embodiment corresponds to the width of the heat exchanger 100.

Rather than being formed in the outer surface of the second manifold 138, fluid opening 140 is also formed in the first manifold 134. As shown, fluid opening 140 is formed in the overhanging or extension portion 161 of the first manifold 134 so as to generally align with openings 165, 166 formed in the spacer or sealing member 164 and upper surface of the extension portion 162 of the second manifold 138. Fluid opening 166 formed in the extension portion 162 of the second manifold 138 provides fluid communication between the extension portion 162 and the open interior space 135 formed in the second manifold 138.

In operation, fluid enters the heat exchanger 100 through fluid opening 136 and is distributed to each of the first flow passages 158 via the open interior space 135 of the first manifold 134 and fluid openings 132 formed in the outer plate 114. The fluid travels along the length of the heat exchanger 100 through the first set of flow passages 158 until reaching the manifold area 184 at the end of the intermediate plate 116 within the open interior space 117 formed by mating outer plates 112, 114 where the fluid is allowed to turn or switch-back and enter the second set of flow passages 160. As the fluid travels through the second set of flow passages 160, it is brought into heat transfer relationship with the incoming fluid flowing through the first flow passages 158. As in the previously described embodiment, this helps to provide a more uniform surface temperature across the surfaces 118 of the heat exchanger 100 since additional heat transfer occurs between the adjacent fluid passages 158, 160 since the temperature of the fluid flowing through the first flow passages 158 tends to be cooler than the temperature of the fluid flowing through the second flow passages 160 having already completed a pass through the heat exchanger 100(1). The alternating arrangement of the first and second flow passages 158, 160 across the surfaces 118 of the heat exchanger 100 gives rise to this "interchannel" heat transfer which tends to contribute to a more uniform surface temperature which has been found desirable for the thermal management of battery units. As well, since the fluid flowing through the heat exchanger 10, 100 flows above and below the intermediate plate 116 with the outer plates 112, 114 providing generally flat surfaces on both sides of the heat exchanger 10, 100, the heat exchanger 10, 100 is capable of providing two main or primary heat transfer surfaces for contact with battery cells or battery cell cases on either side of the heat exchanger 10, 100, 100(1), for instance as an inter-cellular element or ICE plate.

Once the fluid has completed its second pass through the heat exchanger 100(1) through the second flow passages 160, the fluid enters the open interior space 135 of the second manifold 138 via fluid openings 130. From there, the fluid is discharged from the heat exchanger 100 through aligned fluid openings 166, 165 formed in the extension portion 162 of the second manifold 138 via extension channel 167 through to fluid outlet port or opening 140 formed in the first manifold 134. Since both the inlet and outlets 136, 140 are located in the first manifold 134, this arrangement is particularly suited for applications requiring the inlet and outlet to be on the same side of the heat exchanger 100. As well, since the manifolds 134, 138 both comprise only a single row of fluid openings 130, 132 that are generally aligned with each other on respective sides of the heat exchanger 100(1), the subject heat exchanger 100(1) provides additional surface area in the central generally planar regions 118 of the outer plates 112, 114 to allow for additional contact with the corresponding battery cells or battery cell cases/containers.

Figure 19:
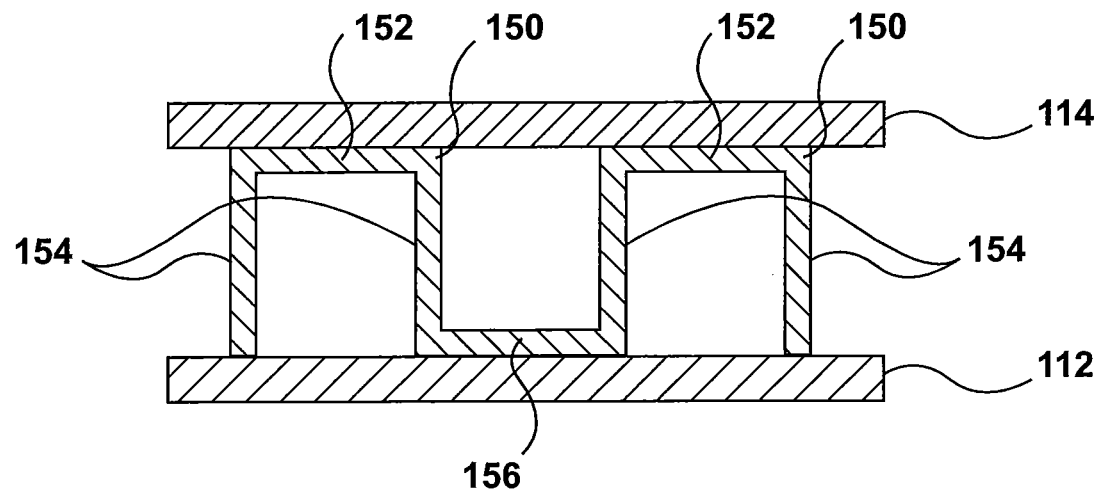
FIG. 19 is a schematic, transverse cross-sectional view of a portion of the heat exchanger of FIG. 13 or FIG. 17.
Figure 20:
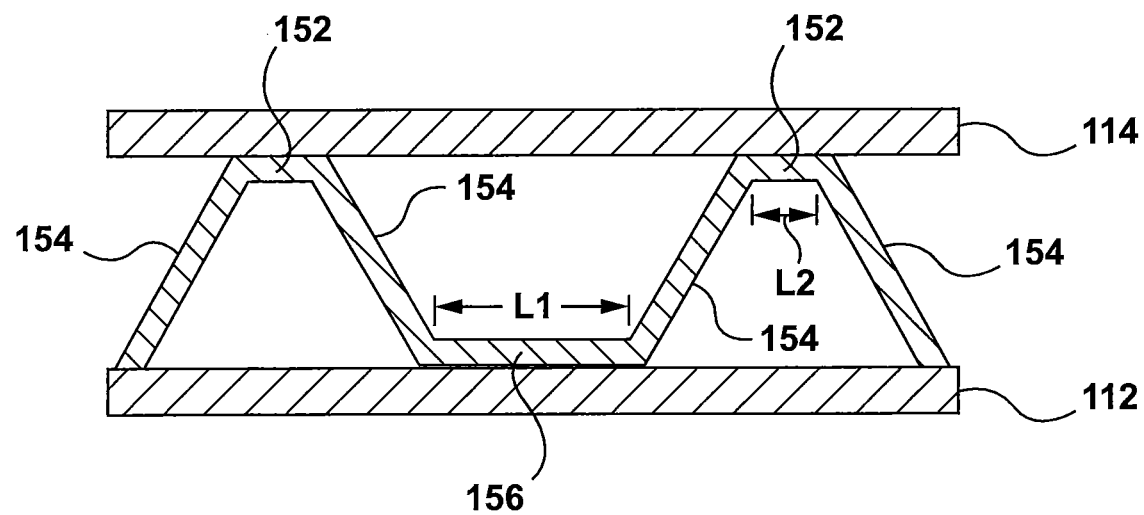
FIG. 20 is a schematic, transverse cross-sectional view of a portion of the heat exchanger of FIG. 13 or FIG. 17 employing a modified intermediate plate.
Figure 21:
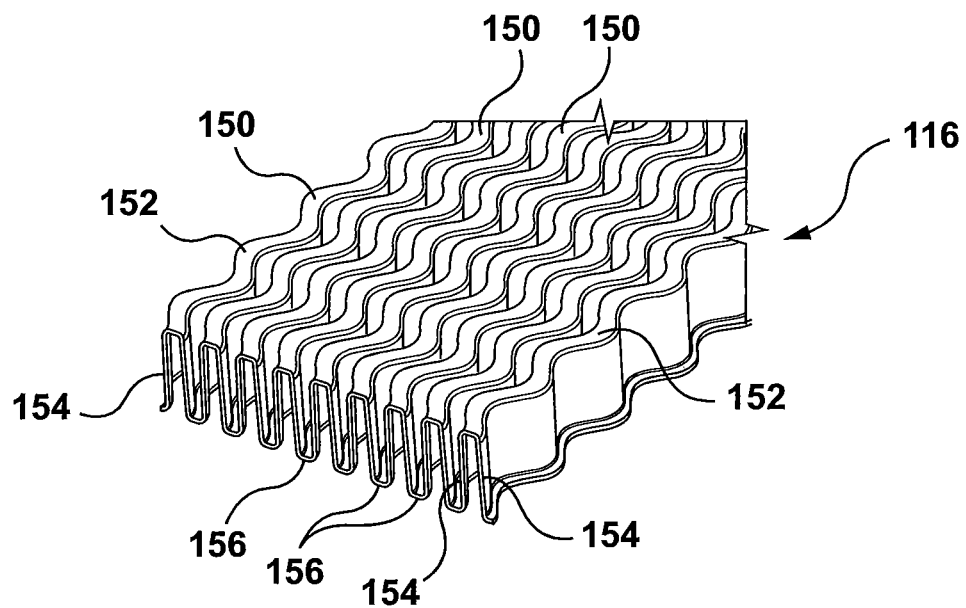
FIG. 21 is a partial, perspective view of another embodiment of an intermediate plate for forming the heat exchanger of FIG. 13 or FIG. 17.

While the embodiments shown in FIGS. 12-18 illustrate the intermediate plate 116 as being in the form of a corrugated fin plate where the corrugations or elongated ridges 150 have a generally square cross-section as shown schematically in FIG. 19 in addition to the previous Figures, it will be understood that the elongated ridges 150 may have alternate forms where the side portions 154 of each of the elongated ridges 150 are angled as shown schematically in FIG. 20, which can allow for the size/width of the fluid channels 158, 160 to be optimized or customized for a particular application. As well, the size of the top surface portions 152 and bottom surface portions 156 can also be varied (see lengths L1, L2), if desired, in order to provide flow passages 158, 160 having the desired properties for a particular application. In other embodiments, the elongated ridges 150 may be wavy or have a sinusoidal format, as shown for instance in FIG. 21, which may serve to create or enhance turbulence in the fluid travelling therethrough so as to improve heat transfer characteristics. Accordingly, it will be understood that the present disclosure is not intended to be limited to square or rectangular corrugations or elongated ridges 150.

Figure 22:
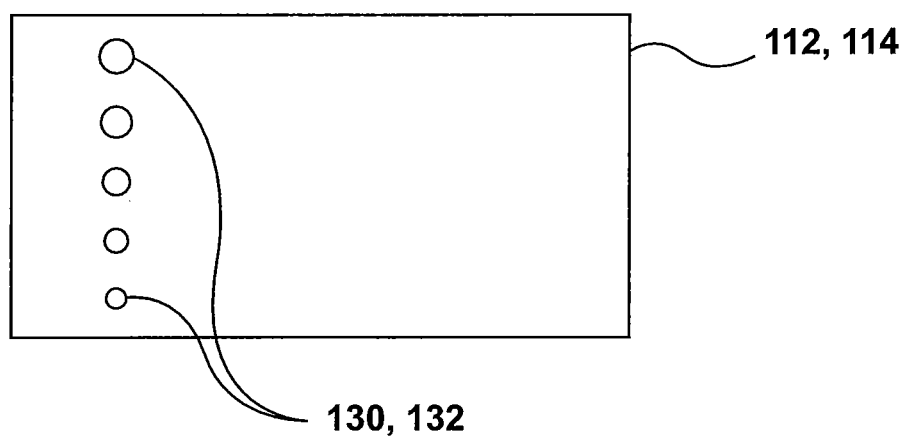
FIG. 22 is a schematic top view of a modified outer plate for use with the heat exchanger of FIG. 13 or FIG. 17.

In some embodiments, in order to enhance fluid distribution to/from between the first and second flow passages 158, 160 and their respective first or second manifold member 134, 138 the size of the fluid openings 130, 132 formed in the corresponding outer plates 112, 114 may be varied so as to provide a row of graded openings 130, 132 as illustrated schematically in FIG. 22.

While example embodiments of the heat exchanger 10, 100, 100(1) have been described, it will be understood that certain adaptations and modifications of the described embodiments can be made. Therefore, the above discussed embodiments are considered to be illustrative and not restrictive.

What is claimed is:

1. A battery cell heat exchanger, comprising:
  a first outer plate defining a central, generally planar portion surrounded by a peripheral flange;
  a second outer plate defining a central, generally planar portion surrounded by a peripheral flange; and
  an intermediate plate disposed between the first outer plate and the second outer plate such that the peripheral flange of the first plate is disposed in sealing engagement with a first side of a peripheral flange area surrounding the intermediate plate and the peripheral flange of the second outer plate is disposed in sealing engagement with a second side of the peripheral flange area of the intermediate;
  a plurality of first fluid flow passages defined between the intermediate plate and the first outer plate, each of the first fluid flow passages having a first end for inletting a fluid into said first fluid flow passages and a second end for discharging said fluid from said first fluid flow passages, said first and second ends defining a flow direction through said plurality of first fluid flow passages;
  a plurality of second fluid flow passages defined between the intermediate plate and the second outer plate, each of the second fluid flow passages having a first end for inletting said fluid into said second fluid flow passages and a second end for discharging said fluid from said second fluid flow passages, said first and second ends defining a flow direction through said second fluid flow passages;
wherein the intermediate plate comprises:
  a first embossment extending out of the plane of the peripheral flange area of said intermediate plate in a first direction and disposed for sealing contact with an inner surface of the second outer plate;
  a first manifold opening disposed in the first embossment in fluid communication with the first ends of the plurality of first fluid flow passages;
  a second embossment extending out of the plane of the peripheral flange area of the intermediate plate in a second direction, opposite to the first direction and disposed for sealing contact with an inner surface of the first outer plate;
  a second manifold opening disposed in the second embossment in fluid communication with the second ends of the plurality of second fluid flow passages;
  a fluid inlet in fluid communication with the first manifold opening for inletting the fluid into the heat exchanger; and a fluid outlet in fluid communication with the second manifold opening for discharging the fluid from the heat exchanger;

wherein:

the plurality of first fluid flow passages and the plurality of second fluid flow passages are disposed in alternating relationship such that each one of the plurality of first fluid flow passages is disposed adjacent to at least one of the plurality of second fluid flow passages, the second ends of the first fluid flow passages are disposed in fluid communication with the first ends of the second fluid flow passages such that the flow direction of the plurality of first fluid flow passages is opposite to the flow direction of the plurality of second fluid flow passages.

2. The heat exchanger as claimed in claim 1, wherein said intermediate plate further comprises:
a first end wherein the first and second embossments are disposed within the first end and arranged along the width of the intermediate plate;
a transition area extending along the width of said intermediate plate inset from the first and second embossments, the transition area extending in the same plane as the peripheral flange area;
a second end comprising a manifold channel extending along the width of the intermediate plate and forming an open, interior space with said first and second outer plates;
a plurality of elongated ridges extending between the transition area and the manifold channel, each of said elongate ridges having a top surface and a pair of side portions, said elongate ridges being interconnected by bottom portions;

wherein the top surface portions extend out of the plane of the peripheral flange area of the intermediate plate in the first direction and are disposed for sealing contact with the second outer plate, and the bottom portions extend out of the plane of the peripheral flange area of the intermediate plate in the second direction and are disposed for sealing contact with the first outer plate.

3. A heat exchanger as claimed in claim 2, wherein said top surface and said pair of side portions of each of said elongated ridges form a longitudinal gap with said first outer plate, the plurality of first fluid flow passages defined within the longitudinal gaps defined by the intermediate plate and the first outer plate; and
wherein said bottom portions and side portions of adjacent elongated ridges form longitudinal gaps with said second outer plate, the plurality of second fluid flow passages defined within the longitudinal gaps defined by the intermediate plate.

4. A heat exchanger as claimed in claim 2, wherein said first fluid flow passages and said second fluid flow passages are interconnected via said manifold channel formed in said intermediate plate.

5. A heat exchanger as claimed in claim 2, further comprising:
a first manifolding area disposed at one end of said heat exchanger in between a first side of said transition area of said intermediate plate and said first outer plate, said first manifolding area fluidly interconnecting said first manifold opening and said plurality of first fluid flow passages;
a second manifolding area disposed at an opposite end of said heat exchanger fluidly interconnecting said plurality of first fluid flow passages and said plurality of second fluid flow passages; and
a third manifolding area disposed in between a second side of said transition area of said intermediate plate and said second outer plate, the third manifolding area disposed generally on top of said first manifolding area, said third manifolding area fluidly interconnecting said plurality of second fluid flow passages and said second manifold opening.

6. The heat exchanger as claimed in claim 2, wherein:
the first embossment includes a sealing surface extending out of the plane of the first embossment in a second, opposite direction, the sealing surface partially surrounding the first manifold opening and disposed for sealing contact with the inner surface said first outer plate; and
the second embossment includes a sealing surface extending out of the plane of the second embossment in the first direction, the sealing surface partially surrounding the second manifold opening and disposed for sealing contact with the inner surface of the second outer plate.

7. A heat exchanger as claimed in claim 1, wherein at least one of said first and second outer plates defines a primary heat transfer surfaces adapted for thermal contact with a plurality of battery cell cases each housing one more battery cells.

8. A heat exchanger as claimed in claim 1, wherein said heat exchanger is arranged in between and in thermal contact with adjacent battery cells or battery cell cases.

9. A heat exchanger as claimed in claim 1, wherein said inlet opening and said outlet opening are disposed adjacent to each other at an end of said heat exchanger and laterally aligned along the width of said heat exchanger.

10. A heat exchanger as claimed in claim 1, wherein:
said first embossment and said second embossment are disposed at opposite side edges of the intermediate plate at one end of the heat exchanger, said intermediate plate further comprising:
a transition area extending along the width of said intermediate plate at a first end thereof, the first embossment disposed at a first end of the transition area and the second embossment disposed at a second, opposite end of the transition area, the transition area extending in the same plane as the peripheral flange area;
a second end comprising a manifold channel extending along the width of the intermediate plate and defining an open, interior space with said first and second outer plates; and
a plurality of elongated ridges formed extending between the transition area and the manifold channel, each elongated ridge having a top surface and a pair of side portions, the top surface portion extending out of the plane of the peripheral flange area of the intermediate plate in the first direction and disposed for sealing contact with the second outer plate, the plurality of elongated ridges being interconnected by bottom portions extending in the second direction opposite to the top portions and disposed for sealing contact with the first outer plate.

11. A heat exchanger as claimed in claim 10, wherein:
a first manifolding area is disposed at the first end of the heat exchanger and defined between a first side of the transition area and the first outer plate and fluidly interconnects said inlet manifold and said plurality of first fluid flow passages; and a further manifolding area is disposed at the first end of the heat exchanger and generally on top of the first manifolding area, the second manifolding area defined between a second side of the transition area of the second outer plate and fluidly interconnects said outlet manifold and said plurality of second fluid flow passages.

12. A heat exchanger as claimed in claim 1, wherein said plurality of first fluid flow passages and said plurality of second fluid flow passages include heat transfer enhancement features formed thereon, wherein said heat transfer enhancement features are selected from one of the following alternatives: dimples, ribs and tabs.

13. A heat exchanger as claimed in claim 2, wherein the intermediate plate includes:
   a plurality of protrusions disposed intermediate the first manifold opening and the transition area, the plurality of protrusions extending out of the plane of the first embossment such that the plurality of protrusions are disposed for sealing contact with the inner surface first outer plate; and
   a plurality of protrusions disposed intermediate the second manifold opening and the transition area, the plurality of protrusions extending out of the plane of the second embossment such that the plurality of protrusions are disposed for sealing contact with the inner surface of the second outer plate.

14. A heat exchanger as claimed in claim 1, wherein the first embossment comprises:
   a first sealing surface extending in the plane of the first embossment and surrounding the first inlet opening, the first sealing surface disposed for sealing contact with the second outer plate;
   a second sealing surface extending in the plane of the first embossment and disposed for sealing contact with the second outer plate; and
   wherein the sealing surface is a third sealing surface disposed intermediate the first sealing surface and the second sealing surface, the third sealing surface being oppositely disposed relative to the first and second sealing surfaces.

15. A heat exchanger as claimed in claim 1, wherein the second embossment comprises:
   a first sealing surface extending in the plane of the second embossment and surrounding the first inlet opening, the first sealing surface disposed for sealing contact with the inner surface of first outer plate;
   a second sealing surface extending in the plane of the second embossment and disposed for sealing contact with the inner surface of the first outer plate;
   wherein the sealing surface is a third sealing surface disposed intermediate the first sealing surface and the second sealing surface, the third sealing surface being oppositely disposed relative to the first and second sealing surfaces.

16. A heat exchanger comprising,
   a first outer plate having a central generally planar portion surrounded by a peripheral edge in the form of a sidewall;
   a second outer plate having a central generally planar portion surrounded by a peripheral edge in the form of a sidewall; and
   an intermediate plate disposed between the first outer plate and the second outer plate wherein said intermediate plate is a corrugated plate having a plurality of elongated ridges each having a top surface portion, a pair of side portions, the elongated ridges being spaced apart and interconnected by bottom surface portions;
   a plurality of first fluid flow passages defined between the intermediate plate and one of the first and second outer plates, each of said first fluid flow passages having a first end for inletting a fluid into said first fluid flow passages and a second end for discharging said fluid from said first fluid flow passages, said first and second ends defining a flow direction through said first fluid flow passages;
   a plurality of second fluid flow passages defined between the intermediate plate and the other one of the first and second outer plates, each of said second fluid flow passages having a first end for inletting said fluid into said second fluid flow passages and a second end for discharging said fluid from said second fluid flow passages, said first and second ends defining a flow direction through said second fluid flow passages;
   wherein the first outer plate, the second outer plate and the intermediate plate are disposed in mating relationship such that the elongated ridges of said intermediate plate define the plurality of first and second flow passages together with said first and second outer plates; and
   said intermediate plate has a length less than said first and second outer plates forming a manifolding area at the end thereof providing fluid communication between said second ends of said first flow passages and said first ends of said second flow passages;
   an inlet manifold in fluid communication with said first ends of said plurality of first fluid flow passages;
   an outlet manifold in fluid communication with said second ends of said plurality of second fluid flow passages;
   a plurality of openings formed in said first outer plate at one end thereof, said plurality of openings providing fluid communication between said inlet manifold and one of said plurality of first flow passages and plurality of second fluid flow passages;
   a plurality of openings formed in said second outer plate at one end thereof, said plurality of second openings providing fluid communication between said outlet manifold and the other of said plurality of first flow passages and plurality of second fluid flow passages;
   wherein:
      each of said inlet and outlet manifolds are elongated members having an open interior space;
      one of said elongated members is disposed on top of and sealingly encloses said plurality of openings in said first outer plate while the other of said elongated members is disposed on top of and sealingly encloses said plurality of openings in said second outer plate;
      each of said inlet and outlet manifolds including an extension portion that extends beyond the width of the heat exchanger, the extension portion of the inlet manifold disposed in sealing contact with the extension portion of the outlet manifold, the open interior space of only one of the inlet and outlet manifolds extending into the extension portion such that the open interior space of the other one of the inlet and outlet manifolds terminates prior to the extension portion;
      a first fluid opening formed in the one of the inlet and outlet manifolds wherein the open interior space terminates prior to the extension portion for providing fluid access to the open interior space formed therein;
      a second fluid opening formed in the extension portion of the one of the inlet manifold and outlet manifolds wherein the open interior space terminates prior to the extension portion, the second fluid opening establishing fluid communication with the open interior space of the other one of the inlet manifold and outlet manifolds, through the extension portion, such that the first fluid opening and the second fluid opening are disposed adjacent to and spaced-apart from one another in the one of the inlet and outlet manifolds wherein the open interior space terminates prior to the extension portion.

17. A heat exchanger as claimed in claim 16, wherein said inlet manifold is disposed on a first side of the heat exchanger and said outlet manifold is disposed on a second, opposite side of said heat exchanger.

18. A heat exchanger as claimed in claim 16 wherein said elongated ridges forming said intermediate plate have one of the following alternative formats: generally square or rectangular longitudinal corrugations, sinusoidal or wavy longitudinal corrugations, or longitudinal corrugations having angled side portions.

19. A heat exchanger as claimed in claim 16, wherein said plurality of openings formed in said first and second outer plates have gradually increasing diameters across the width of the plates.

20. The heat exchanger as claimed in claim 16, wherein: the extension portion of the other one of the inlet manifold and outlet manifold having an extension channel formed therein for providing fluid communication between the second fluid opening formed in the one of the inlet manifold and outlet manifold and the open interior space formed in the other one of the inlet and outlet manifold.

\* \* \* \* \*